(12) United States Patent
Okabe et al.

(10) Patent No.: US 6,889,208 B1
(45) Date of Patent: May 3, 2005

(54) CONTENTS SALE SYSTEM

(75) Inventors: Yasuhisa Okabe, Isehara (JP); Yoshiaki Tanaka, Fujisawa (JP)

(73) Assignee: Victor Company of Japan, Ltd., Yokohama (JP)

(*) Notice: Subject to any disclaimer, the term of this patent is extended or adjusted under 35 U.S.C. 154(b) by 0 days.

(21) Appl. No.: 09/521,773

(22) Filed: Mar. 9, 2000

(30) Foreign Application Priority Data

Apr. 15, 1999 (JP) .......................................... 11-108665
Apr. 30, 1999 (JP) .......................................... 11-123985
Apr. 30, 1999 (JP) .......................................... 11-123998

(51) Int. Cl.$^7$ .......................................... G06F 17/60
(52) U.S. Cl. .......................... 705/57; 705/50; 705/51; 705/52; 705/53; 705/54; 705/55; 705/56; 705/58; 705/59; 705/60; 705/75; 705/24; 705/39; 705/41; 235/380; 235/375; 235/379; 380/29; 380/281; 713/185; 713/193; 713/200
(58) Field of Search .......................... 705/50–60, 75, 705/24, 39, 41; 380/228, 259–262, 283, 29, 281; 235/380, 375, 379; 713/185, 193, 200

(56) References Cited

U.S. PATENT DOCUMENTS 5,237,610 A * 8/1993 Gammie et al. ............ 380/211
5,319,705 A * 6/1994 Halter et al. ................ 380/277

(Continued)

FOREIGN PATENT DOCUMENTS

| EP | 0773490 | 5/1997 | |
|---|---|---|---|
| JP | 7-143081 | 6/1995 | |
| JP | 7-147063 | 6/1995 | |
| JP | 0 773 490 A1 * | 5/1997 | ............ G06F/1/00 |
| JP | 9-146820 | 6/1997 | |
| JP | 9-160899 | 6/1997 | |
| JP | 10-116472 | 5/1998 | |
| JP | 10-163991 | 6/1998 | |
| WO | WO 9802793 | 1/1998 | |
| WO | WO 9811487 | 3/1998 | |
| WO | WO 9842098 | 9/1998 | |

OTHER PUBLICATIONS

Electronic Engineering Times (Mar. 1, 1999), p. 6. Retrived on DIALOG.*

Primary Examiner—James P. Trammell
Assistant Examiner—James A. Reagan
(74) Attorney, Agent, or Firm—Louis Woo

(57) ABSTRACT

In a contents sale system, original contents data are encrypted into encryption-resultant contents data in response to original playback key data. The original playback key data are encrypted into first encryption-resultant playback key data. The first encryption-resultant playback key data are encrypted into second encryption-resultant playback key data in response to an ID of a sale destination terminal apparatus. The encryption-resultant contents data and the second encryption-resultant playback key data are transmitted to the sale destination terminal apparatus. The sale destination terminal apparatus is enabled to decrypt the second encryption-resultant playback key data into the first encryption-resultant playback key data in response to the ID of the sale destination terminal apparatus. The sale destination terminal apparatus is enabled to decrypt the first encryption-resultant playback key data into the original playback key data. The sale destination terminal apparatus is enabled to decrypt the encryption-resultant contents data into the original contents data in response to the original playback key data.

10 Claims, 28 Drawing Sheets

U.S. PATENT DOCUMENTS

| | | | |
|---|---|---|---|
| 5,509,074 A | * 4/1996 | Choudhury et al. | 705/51 |
| 5,796,824 A | 8/1998 | Hasebe et al. | |
| 5,999,629 A | 12/1999 | Heer et al. | |
| 6,055,314 A | * 4/2000 | Spies et al. | 380/228 |
| 6,144,743 A | * 11/2000 | Yamada et al. | 380/42 |
| 6,236,971 B1 | * 5/2001 | Stefik et al. | 705/1 |
| 6,298,441 B1 | * 10/2001 | Handelman et al. | 380/231 |
| 6,332,025 B2 | * 12/2001 | Takahashi et al. | 380/281 |
| 6,351,814 B1 | * 2/2002 | Batinic et al. | 380/264 |
| 6,385,596 B1 | * 5/2002 | Wiser et al. | 369/84 |
| 6,418,421 B1 | * 7/2002 | Hurtado et al. | 705/51 |
| 6,587,837 B1 | * 7/2003 | Spagna et al. | 705/26 |

* cited by examiner

FIG. 2

SALE HEADER

| BYTE NUMBER | b7        b0 | b7        b0 | b7        b0 | b7        b0 |
|---|---|---|---|---|
| 0 | SALE HEADER VERSION | SALE HEADER SIZE | RESERVED (00h) | TRANSFER CONTROL DATA |
| 4 | CONTENTS SALE ID ||||
| 8 | ||||
| 12 | TRANSFER SOURCE ID ||||
| 16 | ||||
| 20 | SALE TICKET NUMBER || SALE SUB HEADER NUMBER | CONTENTS TUNE NUMBER |
| 24 | JAN (POS) CODE (52bits)+"0" 12bits ||||
| 28 | ||||
| 32~60 | MANUFACTURED ARTICLE TITLE (32 Bytes) ||||
| 64~76 | MANUFACTURER'S NAME (16 Bytes) ||||
| 80 | 1st-TUNE DATA LENGTH (4 Bytes) ||||
| 84 | 2nd-TUNE DATA LENGTH (4 Bytes) ||||
|  | Nth-TUNE DATA LENGTH (4 Bytes) ||||
|  | 1st-TUNE NAME ||||
|  | 2nd-TUNE NAME ||||
|  | Nth-TUNE NAME ||||
|  | 1st-TUNE ARTIST NAME ||||
| 32N+108 ~ 32N+132 | 2nd-TUNE ARTIST NAME ||||
|  | Nth-TUNE ARTIST NAME ||||
|  | 1st-TUNE PLAY TIME (HOUR, MINUTE, SECOND, FRAME) ||||
|  | 2nd-TUNE PLAY TIME (HOUR, MINUTE, SECOND, FRAME) ||||
|  | Nth-TUNE PLAY TIME (HOUR, MINUTE, SECOND, FRAME) ||||
| 64N+M-K | PLAYBACK KEY DATA (K Bytes) ||||

TRANSFER CONTROL DATA

FIG. 20

| A00h | PLAYER |
|------|--------|
| A01h | KIOSK TERMINAL |
| A02h | SETTLEMENT BOX |
| A03h | INTERNET CONTENTS MANAGE PORTION |
| A04h | INTERNET SETTLEMENT MANAGE PORTION |
| A05h | TICKET SERVER |
| A06h | KIOSK WORKING MANAGE SERVER |
| A07h | ACCOUNT MANAGE SERVER |
| A08h | INTERNET CLIENT |
| A09h | TRANSMISSION SERVER |
| A0Ah | MASTERING/AUTHORING |
| A0Bh | RESERVED |
| A0Ch | RESERVED |
| A0Dh | RESERVED |
| A0Eh | RESERVED |
| A0Fh | RESERVED |

FIG. 21

| B00h | PLAYER AUTH "A" DATA TRANSMISSION |
|---|---|
| B01h | REPLY HOST AUTH "A" DATA TRANSMISSION |
| B02h | PLAYER ID REQUEST |
| B03h | TRANSFER HISTORY TRANSMISSION REQUEST |
| B04h | TRANSFER HISTORY DELETION REQUEST |
| B05h | TICKET BALANCE TRANSMISSION REQUEST |
| B06h | TICKET ISSUE END NOTICE |
| B07h | RESERVED |
| B08h | RESERVED |
| B09h | USABLE CAPACITY TRANSMISSION REQUEST |
| B0Ah | STORED CONTENTS SALE ID TRANSMISSION REQUEST |
| B0Bh | SALE HEADER TRANSMISSION |
| B0Ch | SALE SUB HEADER TRANSMISSION |
| B0Dh | SALE CONTENTS DATA TRANSMISSION |
| B0Eh | RESERVED |
| B0Fh | PLAYBACK KEY DATA TRANSMISSION |
| B10h | REPLY PLAYER AUTH "A" DATA, HOST AUTH "A" DATA TRANSMISSION |
| B11h | HOST AUTH "A" RESULT TRANSMISSION |
| B12h | PLAYER ID TRANSMISSION |
| B13h | TRANSFER HISTORY TRANSMISSION |
| B14h | TRANSFER HISTORY DELETION NOTICE |
| B15h | TICKET BALANCE TRANSMISSION |
| B16h | TICKET ISSUE RECEPTION NOTICE |
| B17h | RESERVED |
| B18h | RESERVED |
| B19h | USABLE CAPACITY TRANSMISSION |
| B1Ah | STORED CONTENTS SALE ID TRANSMISSION |

FIG. 22

| | |
|---|---|
| B1Bh | RESERVED |
| B1Ch | RESERVED |
| B1Dh | PLAYBACK KEY DATA RECEPTION NOTICE |
| B1Eh | PLAYER AUTH "B" DATA TRANSMISSION |
| B1Fh | REPLY HOST AUTH "B" DATA TRANSMISSION |
| B20h | EDITED DATA TRANSMISSION REQUEST |
| B21h | CONTENTS DELETION DATA TRANSMISSION |
| B22h | EDITING-RESULTANT DATA TRANSMISSION |
| B23h | RESERVED |
| B24h | RESERVED |
| B25h | RESERVED |
| B26h | RESERVED |
| B27h | RESERVED |
| B28h | EDITED DATA TRANSMISSION |
| B29h | SALE CONTENTS DATA DELETION NOTICE |
| B2Ah | EDITING-RESULTANT DATA RECEPTION NOTICE |
| B2Bh | RESERVED |
| B2Ch | RESERVED |
| B2Dh | RESERVED |
| B2Eh | REPLY PLAYER AUTH "B" DATA, HOST AUTH "B" DATA TRANSMIT |
| B2Fh | HOST AUTH "B" RESULT TRANSMISSION |
| B30h-BDFh | RESERVED |
| BE0h | RESERVED |
| BE1h | DATA RECEPTION NOTICE |
| BE2h | COMMAND RECEPTION NOTICE |
| BE3h | COMMAND RETRANSMISSION REQUEST |
| BE4h | STAND-BY COMMAND TRANSMISSION |
| BE5h | RESERVED |
| BE6h | RESERVED |
| BE7h | RESERVED |
| BE8h | RESERVED |
| BE9h | RESERVED |
| BEAh | ELECTRONIC TICKET TRANSMISSION |
| BEBh | RESERVED |
| BECh | RESERVED |
| BEDh | RESERVED |
| BEEh | RESERVED |
| BEFh | DISCONTINUING COMMAND TRANSMISSION |

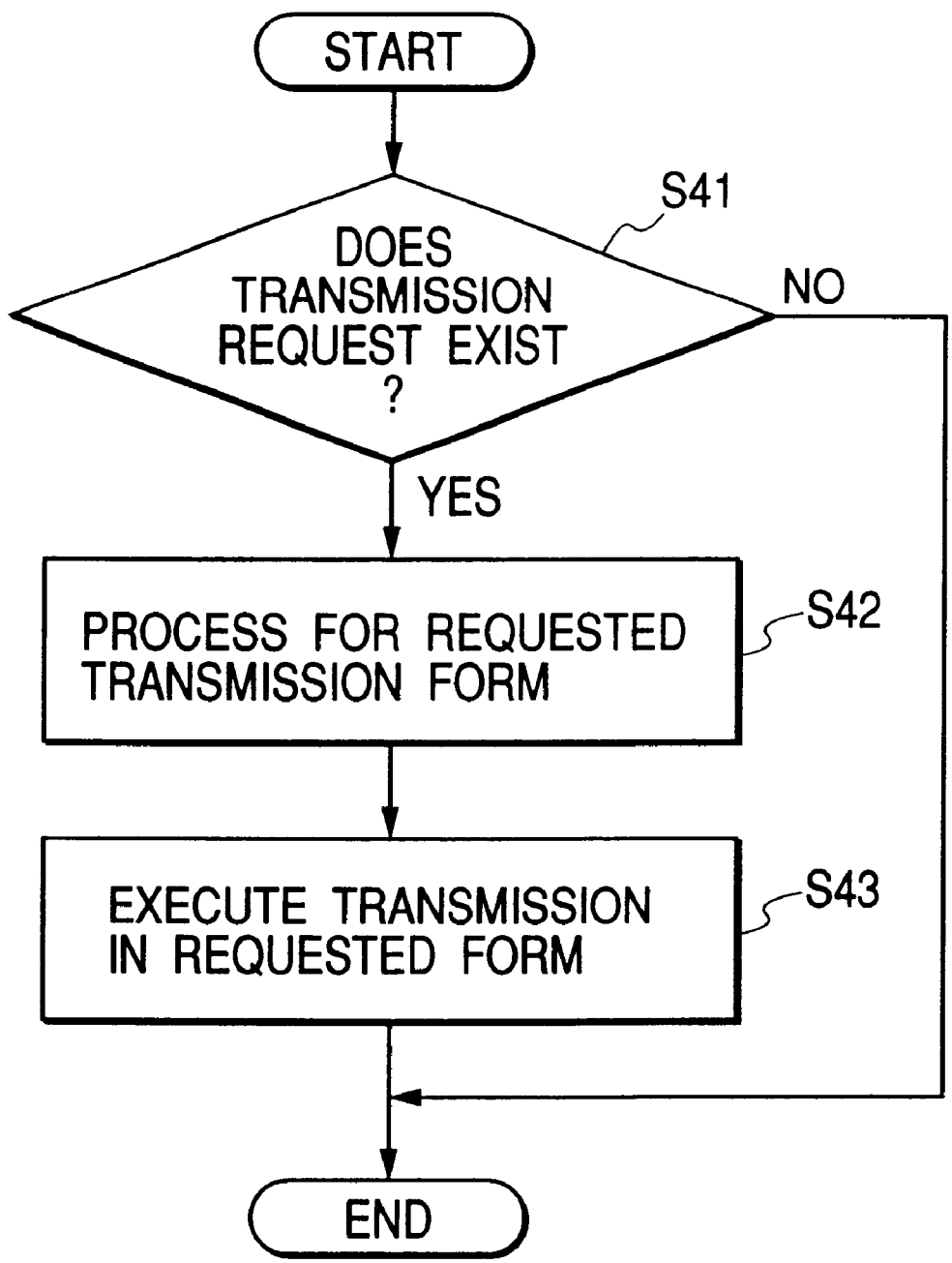

FIG. 26

SALE HEADER IN MASTERING

| | |
|---|---|
| | (COMMON) |
| 64N+M−K | PLAYBACK KEY DATA |
| | MANUFACTURED ARTICLE TITLE |
| | 1st-TUNE NAME |
| | Nth-TUNE NAME |
| | 1st-TUNE ARTIST NAME |
| | Nth-TUNE ARTIST NAME |
| | 1st-TUNE ISRC CODE |
| | Nth-TUNE ISRC CODE |

FIG. 27

SALE SUB HEADER

| BYTE NUMBER | b7 | b0 | b7 | b0 | b7 | b0 | b7 | b0 |
|---|---|---|---|---|---|---|---|---|
| 0 | SUB HEADER VERSION | | SUB HEADER SIZE | | RESERVED (00h) | | TRANSFER CONTROL DATA | |
| 4 | CONTENTS SALE ID | | | | | | | |
| 8 | ... | | | | | | | |
| 12 | TRANSFER SOURCE ID | | | | | | | |
| 16 | ... | | | | | | | |
| 20 | SALE TICKET NUMBER | | | | 00h | | | |
| 24 | JAN (POS) CODE (52bits) + "0" 12bits | | | | | | | |
| 28 | ... | | | | | | | DESIGNATED TUNE NUMBER (1 Byte) |
| 32~60 | MANUFACTURED ARTICLE TITLE (32 Bytes) | | | | | | | |

CONTENTS SALE SYSTEM

BACKGROUND OF THE INVENTION

1. Field of the Invention

This invention relates to a contents sale system in which contents data such as data representing a tune or an audio visual program are transmitted from a selling agency to a customer when the contents data are bought by the customer.

2. Description of the Related Art

In a typical contents sale system, customer's players can be connected to a computer-based host apparatus in a selling agency via a communication network such as the Internet. Contents data, for example, data representing a tune or an audio visual program, are transmitted and downloaded from the host apparatus to a storage unit in a customer's player when the contents data are bought by a customer.

A first conceivable contents sale system includes terminal apparatuses provided in stores respectively. The terminal apparatus in each store can be connected to a host apparatus in a selling agency via a communication network. A customer's player can be directly connected to the terminal apparatus. Contents data can be transmitted and downloaded from the host apparatus in the selling agency to the customer's player via the terminal apparatus in the store.

A second conceivable contents sale system includes a server and clients connected via the Internet. Clients are customer's personal computers respectively. Customer's players can be connected to the customer's personal computers. Contents data can be transmitted and downloaded from a selling agency to a customer's player via the server, the Internet, and a customer's personal computer. The customer's personal computer can be replaced by an equivalent relay station as required for i-mode customers. Here, "i-mode" means a contents-information transmission service provided by a mobile telecommunication company to users of mobile telecommunication terminals via the Internet.

It is desirable to prevent contents data from being transmitted and downloaded to an illegal customer's player. Even in the case where contents data have been transmitted and downloaded to a legitimate customer's player, it is desirable to manage copying the contents data for copyright.

For the convenience of customers, it is desirable to combine contents sale systems of different types into a widely-usable contents sale system.

SUMMARY OF THE INVENTION

It is a first object of this invention to provide a method and an apparatus in a contents sale system which can prevent contents data from being transmitted and downloaded to an illegal customer's player.

It is a second object of this invention to provide a method and an apparatus in a contents sale system which can manage copying contents data after the contents data are bought by a customer.

It is a third object of this invention to provide a method and an apparatus which make a contents sale system convenient.

A first aspect of this invention provides a method in a contents sale system. The method comprises the steps of encrypting original contents data into encryption-resultant contents data in response to original playback key data; encrypting the original playback key data into first encryption-resultant playback key data; encrypting the first encryption-resultant playback key data into second encryption-resultant playback key data in response to an ID of a sale destination terminal apparatus; transmitting the encryption-resultant contents data and the second encryption-resultant playback key data to the sale destination terminal apparatus; enabling the sale destination terminal apparatus to decrypt the second encryption-resultant playback key data into the first encryption-resultant playback key data in response to the ID of the sale destination terminal apparatus; enabling the sale destination terminal apparatus to decrypt the first encryption-resultant playback key data into the original playback key data; and enabling the sale destination terminal apparatus to decrypt the encryption-resultant contents data into the original contents data in response to the original playback key data.

A second aspect of this invention provides a contents sale system comprising a host apparatus, a sale source terminal apparatus, and a sale destination terminal apparatus. The host apparatus comprises means for encrypting original contents data into encryption-resultant contents data in response to original playback key data, means for encrypting the original playback key data into first encryption-resultant playback key data, and means for transmitting the encryption-resultant contents data and the first encryption-resultant playback key data to the sale source terminal apparatus. The sale source terminal apparatus comprises means for encrypting the first encryption-resultant playback key data into second encryption-resultant playback key data in response to an ID of a sale destination terminal apparatus, and means for transmitting the encryption-resultant contents data and the second encryption-resultant playback key data to the sale destination terminal apparatus. The sale destination terminal apparatus comprises means for decrypting the second encryption-resultant playback key data into the first encryption-resultant playback key data in response to the ID of the sale destination terminal apparatus, means for decrypting the first encryption-resultant playback key data into the original playback key data, and means for decrypting the encryption-resultant contents data into the original contents data in response to the original playback key data.

A third aspect of this invention is based on the second aspect thereof, and provides a contents sale system wherein the host apparatus comprises means for making the encryption-resultant contents data and the first encryption-resultant playback key data into a predetermined data structure, and means for transmitting the encryption-resultant contents data and the first encryption-resultant playback key data of the predetermined data structure to the sale source terminal apparatus.

A fourth aspect of this invention is based on the second aspect thereof, and provides a contents sale system wherein the sale source terminal apparatus comprises means for receiving the ID of the sale destination terminal apparatus from the sale destination terminal apparatus.

A fifth aspect of this invention is based on the second aspect thereof, and provides a contents sale system wherein the sale destination terminal apparatus comprises means for transmitting the ID of the sale destination terminal apparatus to the sale source terminal apparatus.

A sixth aspect of this invention is based on the second aspect thereof, and provides a contents sale system further comprising a copy destination terminal apparatus. The sale destination terminal apparatus comprises means for encrypting the first encryption-resultant playback key data into third encryption-resultant playback key data in response to an ID of the copy destination terminal apparatus, and means for transmitting the encryption-resultant contents data and the third encryption-resultant playback key data to the copy destination terminal apparatus. The copy destination terminal apparatus comprises means for decrypting the third encryption-resultant playback key data into the first encryption-resultant playback key data in response to the ID of the copy destination terminal apparatus, means for decrypting the first encryption-resultant playback key data into the original playback key data, and means for decrypting the encryption-resultant contents data into the original contents data in response to the original playback key data.

A seventh aspect of this invention provides a host apparatus in a contents sale system. The host apparatus comprises means for encrypting original contents data into encryption-resultant contents data in response to original playback key data; means for encrypting the original playback key data into first encryption-resultant playback key data; means for making the encryption-resultant contents data and the first encryption-resultant playback key data into a predetermined data structure; and means for transmitting the encryption-resultant contents data and the first encryption-resultant playback key data of the predetermined data structure to a sale source terminal apparatus.

An eighth aspect of this invention provides a sale source terminal apparatus in a contents sale system. The sale source terminal apparatus comprises means for receiving encryption-resultant contents data and first encryption-resultant playback key data from a host apparatus; means for receiving an ID of a sale destination terminal apparatus from the sale destination terminal apparatus; means for encrypting the first encryption-resultant playback key data into second encryption-resultant playback key data in response to the ID of the sale destination terminal apparatus; and means for transmitting the encryption-resultant contents data and the second encryption-resultant playback key data to the sale destination terminal apparatus.

A ninth aspect of this invention provides a sale destination terminal apparatus in a contents sale system. The sale destination terminal apparatus comprises means for transmitting an ID of the sale destination terminal apparatus to a sale source terminal apparatus; means for receiving encryption-resultant contents data and second encryption-resultant playback key data from the sale source terminal apparatus; means for decrypting the second encryption-resultant playback key data into first encryption-resultant playback key data in response to the ID of the sale destination terminal apparatus; means for decrypting the first encryption-resultant playback key data into original playback key data; and means for decrypting the encryption-resultant contents data into original contents data in response to the original playback key data.

A tenth aspect of this invention is based on the ninth aspect thereof, and provides a sale destination terminal apparatus further comprising means for receiving an ID of a copy destination terminal apparatus from the copy destination terminal apparatus; means for encrypting the first encryption-resultant playback key data into third encryption-resultant playback key data in response to the ID of the copy destination terminal apparatus; and means for transmitting the encryption-resultant contents data and the third encryption-resultant playback key data to the copy destination terminal apparatus.

An eleventh aspect of this invention provides a method in a contents sale system. The method comprises the steps of adding information representative of a copy generation number to contents data; updating the copy generation number represented by the information each time the contents data are transmitted between sale destination terminal apparatuses; and uploading the information representative of the copy generation number to a host side.

A twelfth aspect of this invention is based on the eleventh aspect thereof, and provides a method further comprising the step of prohibiting transmission of the contents data between sale destination terminal apparatuses when the copy generation number represented by the information reaches a predetermined number.

A thirteenth aspect of this invention is based on the first aspect thereof, and provides a method further comprising the steps of providing a sale header which corresponds to the original contents data, and encrypting the original playback key data into the first encryption-resultant playback key data in response to the sale header.

A fourteenth aspect of this invention provides a method in a contents sale system including a source terminal and a player of a user side. The method comprises the steps of enabling the source terminal to transmit a transmission request signal to the player, the transmission request signal representing a request for transmission of one of a data signal and a command signal of a predetermined format; enabling the player to transmit one of the data signal and the command signal of the predetermined format to the source terminal only when receiving the transmission request signal from the source terminal; and inhibiting the player from spontaneously transmitting one of the data signal and the command signal of the predetermined format.

A fifteenth aspect of this invention is based on the fourteenth aspect thereof, and provides a method wherein the source terminal is located in a store.

A sixteenth aspect of this invention is based on the fourteenth aspect thereof, and provides a method wherein the source terminal comprises an Internet server, and the transmission request signal is transmitted from the Internet server to the player via an Internet client.

A seventeenth aspect of this invention provides a player in a contents sale system. The player comprises means for receiving a transmission request signal from a source terminal, the transmission request signal representing a request for transmission of one of a data signal and a command signal of a predetermined format; means for transmitting one of the data signal and the command signal of the predetermined format to the source terminal only when receiving the transmission request signal from the source terminal; and means for inhibiting spontaneous transmission of one of the data signal and the command signal of the predetermined format.

An eighteenth aspect of this invention provides a method in a contents sale system. The method comprises the steps of making ones of command signals and data signals transmitted between terminal apparatuses into a common format; and in cases where a source apparatus among the terminal apparatuses transmits one of a command signal and a data signal to a destination apparatus among the terminal apparatuses, enabling the source apparatus to add an ID of the source apparatus to one of the command signal and the data signal transmitted to the destination apparatus.

A nineteenth aspect of this invention provides a method in a contents sale system. The method comprises the steps of making sale contents data, which are transmitted from source apparatuses to user-side players, into a common format; and in cases where the source apparatuses transmit the sale contents data to the user-side players, enabling the source apparatuses to add common sale headers to the sale contents data transmitted to the user-side players.

A twentieth aspect of this invention is based on the nineteenth aspect thereof, and provides a method wherein portions of headers added to the sale contents data by a host, and portions of the sale headers added to the sale contents data transmitted to the user-side players are common.

A twenty-first aspect of this invention is based on the nineteenth aspect thereof, and provides a method further comprising the steps of in cases where the sale contents data representing a plurality of tunes, enabling the source apparatuses to add sale sub headers of formats, which are common for each of the tunes, to the sale contents data transmitted to the user-side players; and enabling the user-side players to transmit a portion of the sale contents data with a related sale sub header therebetween to copy each of the tunes.

A twenty-second aspect of this invention is based on the nineteenth aspect thereof, and provides a method wherein the sale headers contain information pieces of management of the sale contents data.

A twenty-third aspect of this invention is based on the nineteenth aspect thereof, and provides a method wherein the sale contents data comprise encryption-resultant data, and the sale headers contain key data for decrypting the encryption-resultant data.

A twenty-fourth aspect of this invention provides a method in a contents sale system. The method comprises the steps of dividing original text data related to sale contents into segments having a predetermined number of bits which is equal to a number of bits composing playback key data; implementing Exclusive-OR operation between each of the segments of the original text data and the playback key data to encrypt the original text data into encryption-resultant text data; and transmitting the encryption-resultant text data to a player of a user side.

A twenty-fifth aspect of this invention provides a medium handling data of a format provided by one of the methods in the eighteenth to twenty-fourth aspects of this invention.

A twenty-sixth aspect of this invention provides a player comprising a sale destination terminal apparatus. The sale destination terminal apparatus includes a mobile telephone terminal device which receives data from the sale source terminal apparatus of the eighth aspect of this invention via a mobile telephone contents-information transmission service.

BRIEF DESCRIPTION OF THE DRAWINGS

FIG. 2 is a diagram of the structure of a sale header transmitted to a customer's player in FIG. 1.

FIG. 20 is a diagram of a list of code words assigned to transmission sources.

FIGS. 21 and 22 are diagrams of lists of code words assigned to commands or transmitted-signal types.

FIG. 23 is a flowchart of a segment of a control program for a computer in a customer's player in the third embodiment of this invention.

FIG. 26 is a diagram of a structure of a sale header provided and added by an authoring system unit during a mastering process in a fifth embodiment of this invention.

FIG. 27 is a diagram of a structure of a sale sub header transmitted to a customer's player.

DESCRIPTION OF THE PREFERRED EMBODIMENTS

First Embodiment

Figure 1:
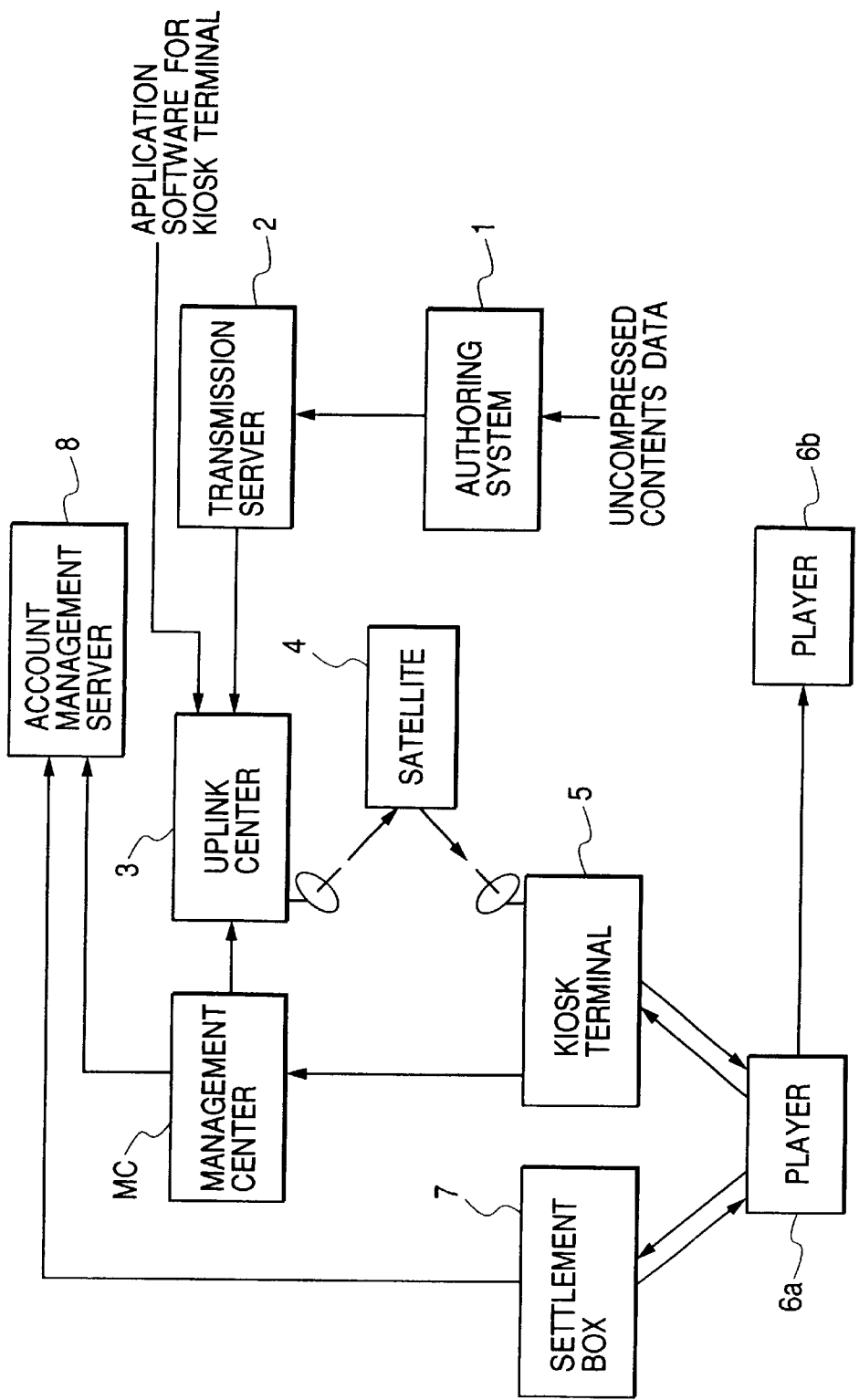
FIG. 1 is a block diagram of a contents sale system according to a first embodiment of this invention.

With reference to FIG. 1, a contents sale system includes a terminal apparatus 5 located in a store (for example, a kiosk or a convenience store). The terminal apparatus 5 is also referred to as the kiosk terminal apparatus 5. The terminal apparatus 5 includes a computer, communication devices, and an interface for connection with a customer's player. First one of the communication devices is designed for communications with a satellite 4. Second one of the communication devices is designed for wire-telephone communications with a management center MC. The computer in the terminal apparatus 5 operates in accordance with a control program stored in a memory. The control program is designed to enable the terminal apparatus 5 to implement processes mentioned later. The computer in the terminal apparatus 5 forms a kiosk server.

A host side (a selling agency) of the contents sale system includes a computer-based authoring system unit 1 connected to at least one of an audio CD drive, an audio DVD drive, and a storage unit having a database of tunes. A computer in the authoring system unit 1 operates in accordance with a control program stored in a memory. The control program is designed to enable the authoring system unit 1 to implement processes mentioned later. The authoring system unit 1 receives uncompressed music contents data, that is, uncompressed data representative of at least one tune, from the audio CD drive, the audio DVD drive, or the storage unit. The authoring system unit 1 compresses the received contents data by given signal processing such as "Twin VQ". The authoring system unit 1 encrypts or scrambles the compression-resultant contents data in response to playback key data. In addition, the authoring system unit 1 encrypts the playback key data into primary encryption-resultant playback key data (first encryption-resultant playback key data). The authoring system unit 1 combines the encryption-resultant contents data and the primary encryption-resultant playback key data into composite data of a given format (a given structure). The authoring system unit 1 may record the composite data.

The authoring system unit 1 feeds the composite data to a transmission server 2. The transmission server 2 feeds the composite data to an uplink center 3 which can communicate with the satellite 4. The uplink center 3 transmits the composite data to the terminal apparatus 5 via the satellite 4. The kiosk server in the terminal apparatus 5 receives the composite data. The uplink center 3 is connected to the management center MC.

A customer's player 6a can be connected to the terminal apparatus 5 via an IEEE1394 interface. The player 6a includes a computer which operates in accordance with a control program stored in a memory. The control program is designed to enable the player 6a to implement processes mentioned later. The player 6a also includes a storage unit. A predetermined ID (a predetermined identification code word) is assigned to the player 6a. In the case where the player 6a is connected with the terminal apparatus 5, the player 6a informs the terminal apparatus 5 of its own ID before downloading. The terminal apparatus 5 separates the composite data into the primary encryption-resultant playback key data and the encryption-resultant contents data. The terminal apparatus 5 encrypts the primary encryption-resultant playback key data into secondary encryption-resultant playback key data (second encryption-resultant playback key data). In the case where the terminal apparatus 5 is connected with the player 6a, the terminal apparatus 5 downloads the encryption-resultant contents data and the secondary encryption-resultant playback key data into the storage unit of the player 6a. The player 6a recovers original contents data by decrypting the encryption-resultant contents data. In addition, the player 6a generates other secondary encryption-resultant playback key data (third encryption-resultant playback key data) which will be used for data transfer or data copying to another player.

A customer's player 6b can be connected to the customer's player 6a. The player 6b includes a computer which operates in accordance with a control program stored in a memory. The control program is designed to enable the player 6b to implement processes mentioned later. The player 6b also includes a storage unit. A predetermined ID (a predetermined identification code word) is assigned to the player 6b. In the case where the player 6b is connected with the player 6a, the player 6b informs the player 6a of its own ID before contents data are transferred or copied. During the data transfer, the copy-source player 6a transmits the encryption-resultant contents data and the secondary encryption-resultant playback key data into the storage unit of the copy-destination player (the transfer-destination player) 6b. Thus, the encryption-resultant contents data and the secondary encryption-resultant playback key data are copied.

The contents sale system in FIG. 1 uses an accounting system designed as follows. The user (owner) of the player 6a is required buy an electronic ticket on a prepaid basis. When the user buys an electronic ticket, a signal representing the balance (the ticket balance) is stored in an electronic purse provided in the player 6a. The player 6a can be connected to a computer-based settlement box 7 provided with a device for wire-telephone communications. In the case where the player 6a is connected with the settlement box 7, the balance represented by the signal in the electronic purse can be updated by the settlement box 7. In addition, the settlement box 7 transmits accounting information, which relates to the balance in the player 6a, to an account management server 8. The accounting management server 8 includes a communication device for wire-telephone communications with the management center MC.

Music-related data transferred from the terminal apparatus 5 to the player 6a, and music-related data transferred from the player 6a to the player 6b are of a given format. Specifically, the music-related data transferred from the terminal apparatus 5 to the player 6a contain a sale header, a sale sub header, and encryption-resultant contents data. Similarly, the music-related data transferred from the player 6a to the player 6b contain a sale header, a sale sub header, and encryption-resultant contents data. The encryption-resultant contents data include a contents header, a sound stream, text data, and extension data. The sound stream represents music contents. The text data represent tune names and artist names.

As shown in FIG. 2, the sale header has a size of 64N+M bytes which depends on the number "N" of tunes in the sale contents, where "M" denotes a predetermined natural number. In the sale header, one byte (the 4-th byte) is occupied by transfer control data, and K bytes, that is, the (64N+M−K)-th byte to the (64N+M)-th byte, are occupied by encryption-resultant playback key data (secondary encryption-resultant playback key data). Here, "K" denotes a predetermined natural number.

Specifically, bytes of the sale header in FIG. 2 are sequentially assigned to indications of different items as follows.

1 byte of a sale header version;
1 byte of a sale header size;
1 byte reserved;
1 byte of transfer control data;
8 bytes of a contents sale ID;
8 bytes of a transmission source ID;
2 bytes of a sale ticket number;
1 byte of a sale sub header number;
1 byte of a contents tune number;
32 bytes of a manufactured article title;
16 bytes of a manufacturer's name;
4 by N bytes of data lengths of respective tunes;
8 by N bytes of the names of the respective tunes;
8 by N bytes of the names of artists of the respective tunes;
4 by N bytes of the play times of the respective tunes; and
K bytes of encryption-resultant playback key data.

Figure 3:
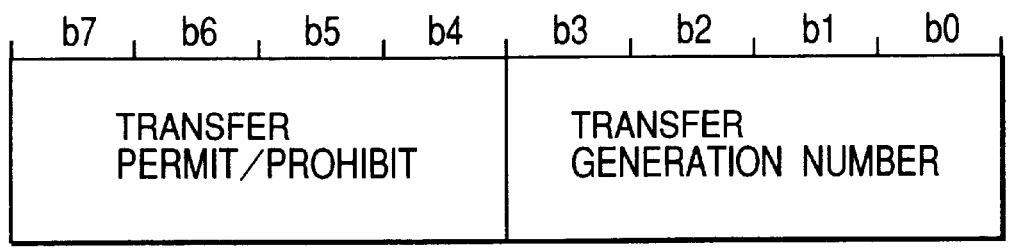
FIG. 3 is a diagram of the structure of transfer control data in FIG. 2.

As shown in FIG. 3, the transfer control data contain four bits b0, b1, b2, and b3 occupied by a data piece representing a transfer generation number (a copy generation number), and four bits b4, b5, b6, and b7 occupied by a data piece representing whether transfer (copying) is prohibited or permitted.

Specifically, the transfer-generation-number data piece (the copy-generation-number data) b0, b1, b2, and b3 being "0000" is assigned to prohibition on transfer (copying). The transfer-generation-number data piece b0, b1, b2, and b3 being anyone between "0001" and "1111" is assigned to an indication of a transfer generation number (a copy generation number) and also permission to transfer (copy) contents data. The related copyright holder or the host side sets an initial number represented by the transfer-generation-number data piece. Each time transferring or copying contents data is executed, the transfer-source player or apparatus (the copy-source player or apparatus) processes the transferred data or the copied data so that the number represented by the transfer-generation-number data piece is decremented by "1". When the transfer-generation-number data piece reaches "0000", transferring or copying contents data is prohibited. For example, the transfer-source player or apparatus (the copy-source player or apparatus) is disabled by the transfer-generation-number data piece being "0000".

The transfer prohibition/permission data piece (the copying prohibition/permission data piece) b4, b5, b6, and b7 being "0000" is assigned to permission to transfer (copy) contents data. The transfer prohibition/permission data piece b4, b5, b6, and b7 being "0001" is assigned to prohibition on transfer (copying).

Figure 4:
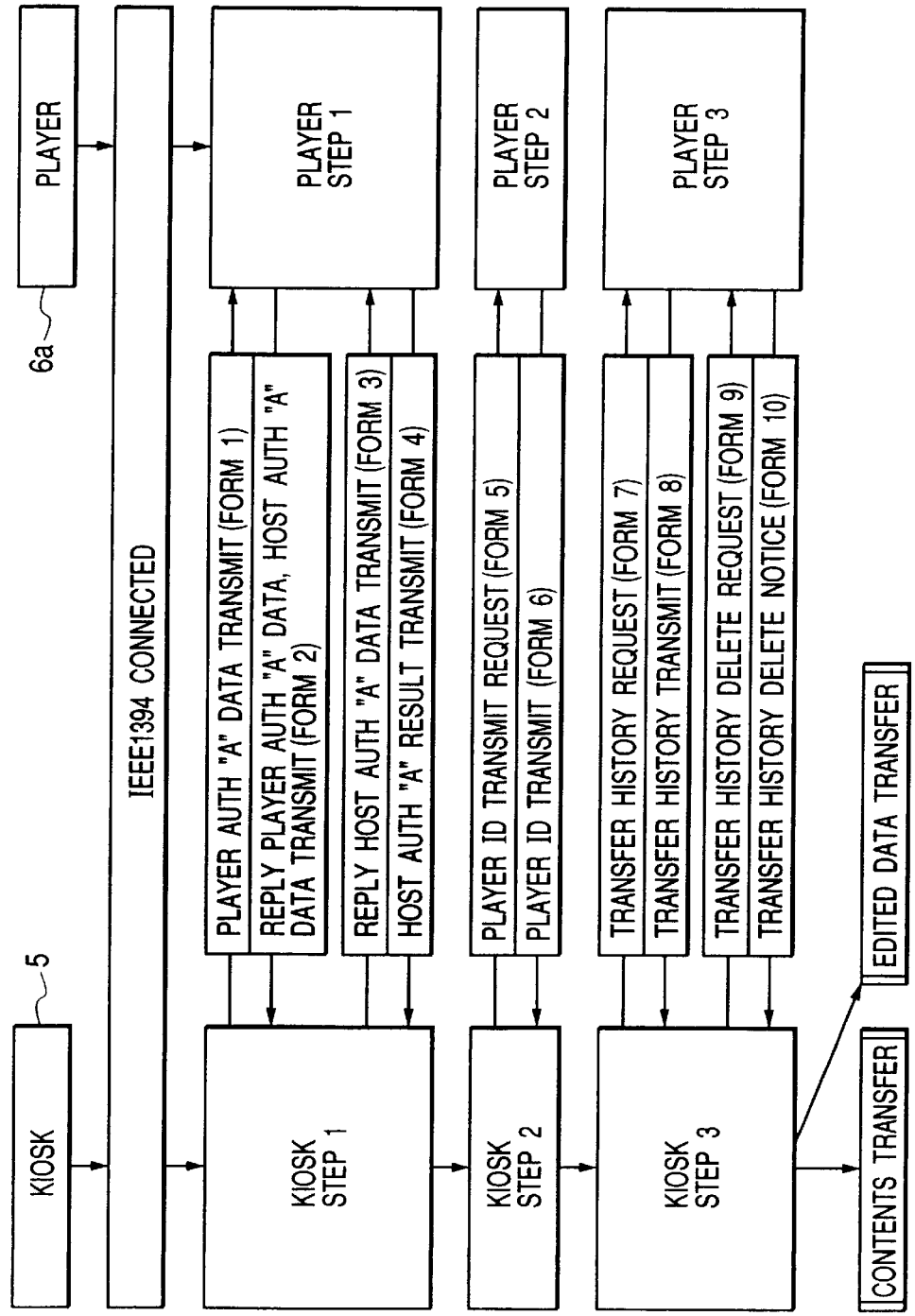
FIGS. 4, 5, and 6 are diagrams showing a sequence of communications between a kiosk terminal apparatus and the customer's player in FIG. 1.
Figure 5:
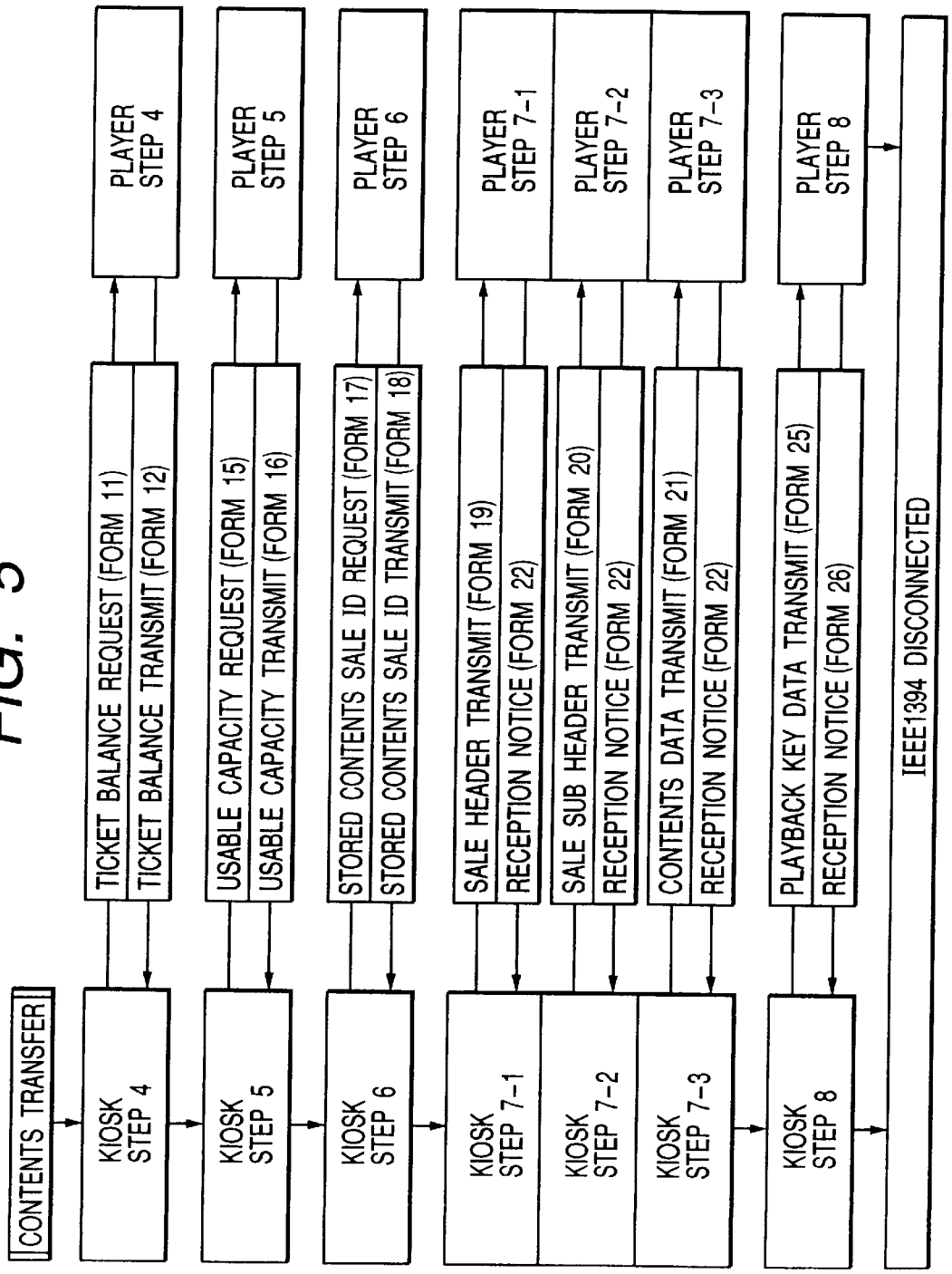
Figure 6:
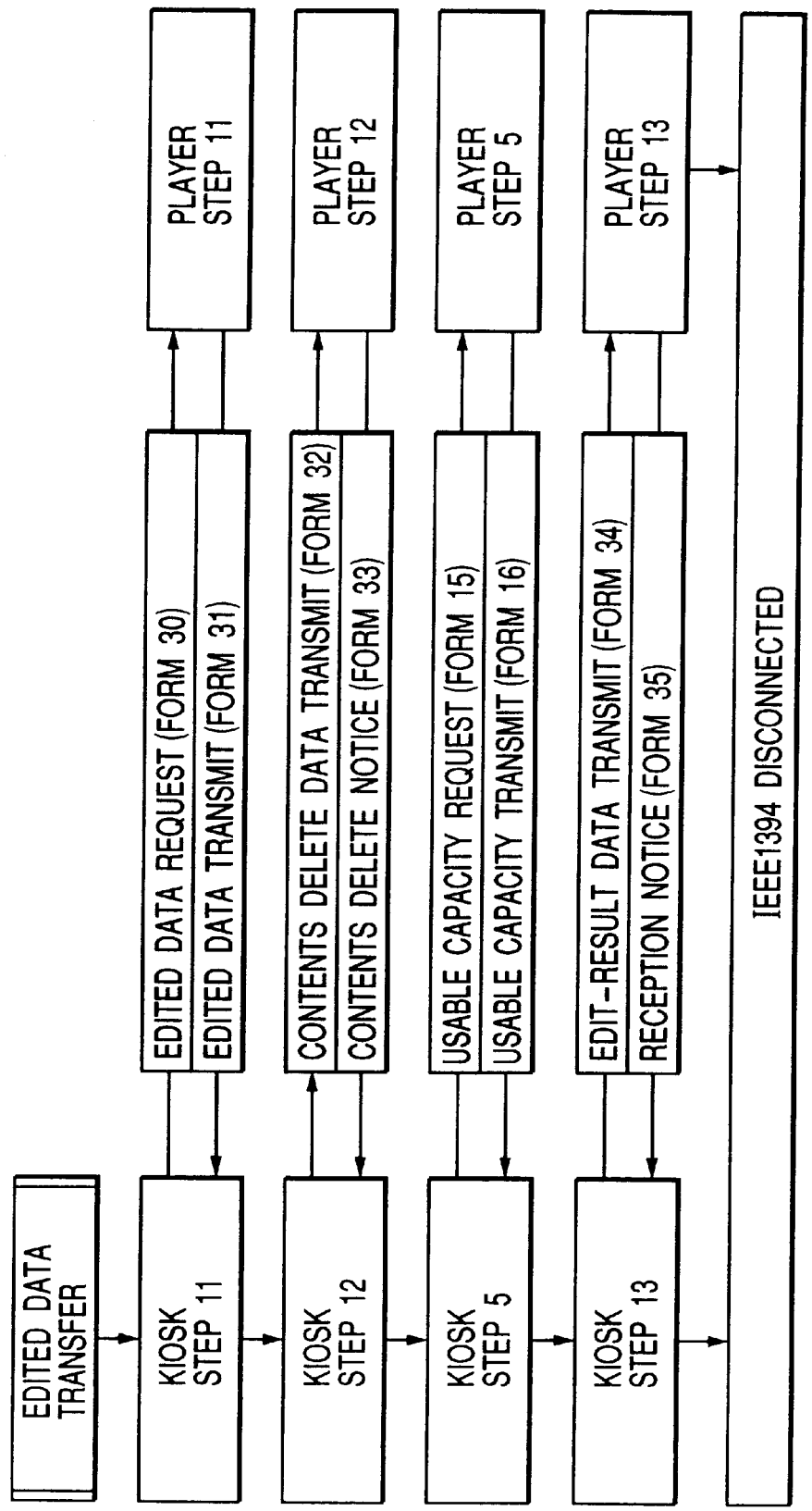

FIGS. 4, 5, and 6 show a sequence of communications between the kiosk terminal apparatus 5 and the customer's player 6a. In FIGS. 4, 5, and 6, "Form 1", "Form 2", . . . denote forms of transmitted signals respectively.

With reference to FIG. 4, in the case where the customer's player 6a is connected with the kiosk terminal apparatus 5 via the IEEE1394 interface, the kiosk terminal apparatus 5 transmits player authentication "A" data of a form "1" to the customer's player 6a. In response to the player authentication "A" data, the customer's player 6a transmits reply player authentication "A" data and host authentication "A" data of a form "2" to the kiosk terminal apparatus 5. Then, the kiosk terminal apparatus 5 transmits reply host authentication "A" data of a form "3" to the customer's player 6a. In response to the reply host authentication "A" data, the customer's player 6a transmits a form-"4" signal of the result of host authentication "A" to the kiosk terminal apparatus 5.

Subsequently, the kiosk terminal apparatus 5 transmits a form-"5" signal of a player ID transmission request to the customer's player 6a. In response to the signal of the player ID transmission request, the customer's player 6a transmits a form-"6" signal of its own player ID to the kiosk terminal apparatus 5. Then, the kiosk terminal apparatus 5 transmits a form-"7" signal of a transfer history transmission request (a copy history transmission request) to the customer's player 6a. In response to the signal of the transfer history transmission request, the customer's player 6a transmits a form-"8" signal of a transfer history (a copy history) to the kiosk terminal apparatus 5. Subsequently, the kiosk terminal apparatus 5 transmits a form-"9" signal of a transfer history deletion request (a copy history deletion request) to the customer's player 6a. In response to the signal of the transfer history deletion request, the customer's player 6a transmits a form-"10" signal of a transfer history deletion notice (a copy history deletion notice) to the kiosk terminal apparatus 5. Then, the communication sequence advances to either a contents transfer stage or an edited data transfer stage in accordance with operation of the kiosk terminal apparatus 5.

With reference to FIG. 5, during the contents transfer stage, the kiosk terminal apparatus 5 transmits a form-"11" signal of a ticket balance transmission request to the customer's player 6a. In response to the signal of the ticket balance transmission request, the customer's player 6a transmits a form-"12" signal of a ticket balance to the kiosk terminal apparatus 5. Then, the kiosk terminal apparatus 5 transmits a form-"15" signal of a usable-memory-capacity transmission request (an unoccupied-memory-capacity transmission request) to the customer's player 6a. In response to the signal of the usable-memory-capacity transmission request, the customer's player 6a transmits a form-"16" signal of a usable memory capacity (an unoccupied memory capacity) to the kiosk terminal apparatus 5. Subsequently, the kiosk terminal apparatus 5 transmits a form-"17" signal of a stored contents sale ID transmission request to the customer's player 6a. In response to the signal of the stored contents sale ID transmission request, the customer's player 6a transmits a form-"18" signal of a stored contents sale ID to the kiosk terminal apparatus 5. Then, the kiosk terminal apparatus 5 transmits a sale header of a form "19" to the customer's player 6a. The customer's player 6a transmits a form-"22" signal of a data reception notice to the kiosk terminal apparatus 5 when successfully receiving the sale header. Thereafter, the kiosk terminal apparatus 5 transmits a sale sub header of a form "20" to the customer's player 6a. The customer's player 6a transmits a form-"22" signal of a data reception notice to the kiosk terminal apparatus 5 when successfully receiving the sale sub header. Then, the kiosk terminal apparatus 5 transmits contents data (encryption-resultant contents data) of a form "21" to the customer's player 6a. The customer's player 6a transmits a form-"22" signal of a data reception notice to the kiosk terminal apparatus 5 when successfully receiving the contents data. Subsequently, the kiosk terminal apparatus 5 transmits playback key data (secondary encryption-resultant playback key data) of a form "25" to the customer's player 6a. The customer's player 6a transmits a form-"26" signal of a data reception notice when successfully receiving the playback key data. Thereafter, the customer's player 6a is disconnected from the kiosk terminal apparatus 5. In other words, the IEEE1394 interface between the kiosk terminal apparatus 5 and the customer's player 6a is disconnected.

With reference to FIG. 6, during the edited data transfer stage, the kiosk terminal apparatus 5 transmits a form-"30" signal of a request for transmission of edited data (data to be edited) to the customer's player 6a. In response to the signal of the edited data transmission request, the customer's player 6a transmits edited data (data to be edited) of a form "31" to the kiosk terminal apparatus 5. Then, the kiosk terminal apparatus 5 transmits contents deletion data of a form "32" to the customer's player 6a. In response to the contents deletion data, the customer's player 6a transmits a form-"33" signal of a contents deletion notice to the kiosk terminal apparatus 5. Subsequently, the kiosk terminal apparatus 5 transmits a form-"15" signal of a usable-memory-capacity transmission request (an unoccupied-memory-capacity transmission request) to the customer's player 6a. In response to the signal of the usable-memory-capacity transmission request, the customer's player 6a transmits a form-"16" signal of a usable memory capacity (an unoccupied memory capacity) to the kiosk terminal apparatus 5. Then, the kiosk terminal apparatus 5 transmits editing-resultant data of a form "34" to the customer's player 6a. The customer's player 6a transmits a form-"35" signal of a data reception notice to the kiosk terminal apparatus 5 when successfully receiving the editing-resultant data. Thereafter, the customer's player 6a is disconnected from the kiosk terminal apparatus 5. In other words, the IEEE1394 interface between the kiosk terminal apparatus 5 and the customer's player 6a is disconnected.

Figure 7:
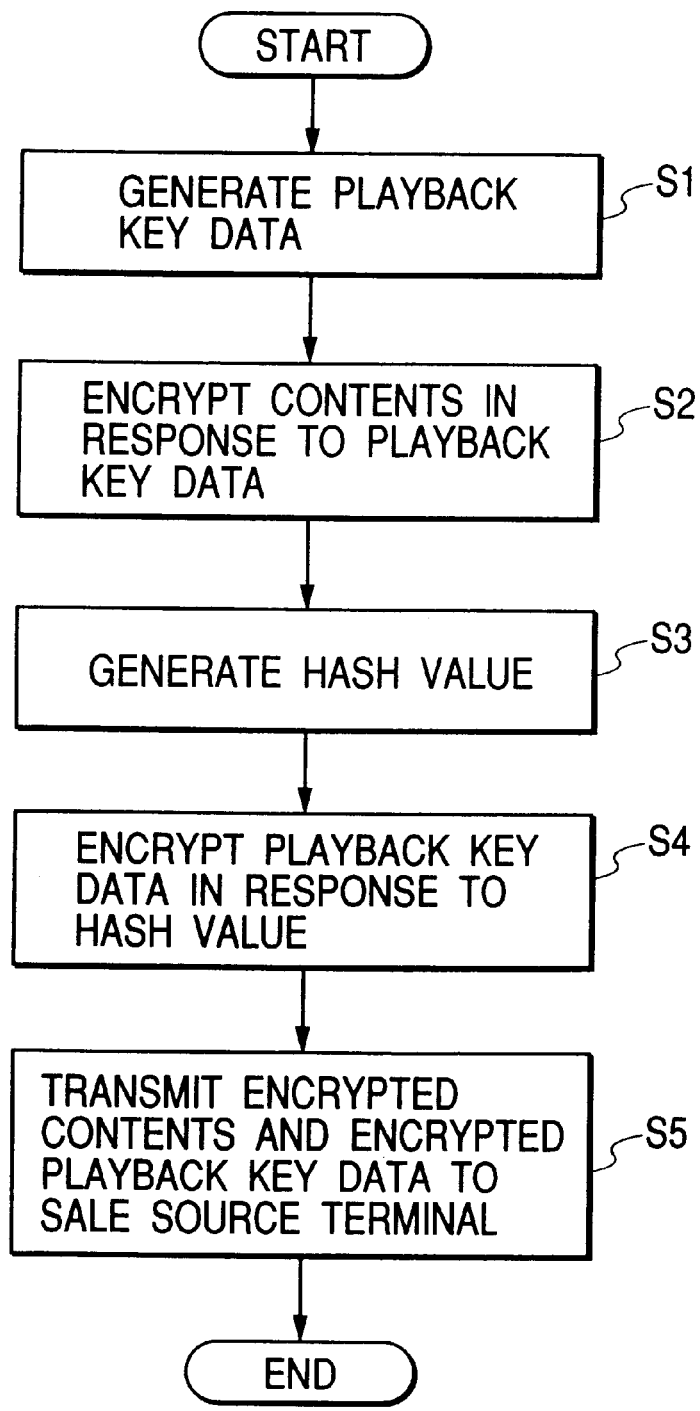
FIG. 7 is a flowchart of a segment of a control program for a computer in an authoring system unit in FIG. 1.

As previously mentioned, the authoring system unit 1 includes a computer which operates in accordance with a control program stored in a memory. FIG. 7 is a flowchart of a segment of the control program. As shown in FIG. 7, a first step S1 of the program segment generates 16-byte playback key data in response to a random number for every sale header.

A step S2 following the step S1 divides sale contents data into regions of a contents header, a sound stream, text data, and extension data respectively. The sound stream represents music contents. The text data represent tune names and artist names. The step S2 executes Exclusive-OR operation between each of the regions and the playback key data 16-byte by 16-byte. Thus, the step S2 encrypts or scrambles the sale contents data independently for the regions. In this way, the step S2 generates encryption-resultant contents data.

A step S3 subsequent to the step S2 generates 16-byte data of a hash value on the basis of a sequence of characters in each sale header in the designation item order and a sequence of characters in each sale sub header in the designation item order according to a hash function (MD5).

A step S4 following the step S3 executes Exclusive-OR operation between the playback key data and the hash value data, thereby encrypting the playback key data into primary encryption-resultant playback key data for every sale header.

A step S5 subsequent to the step S4 places the primary encryption-resultant playback key data in an appointed area of every sale header. The step S5 transmits the encryption-resultant contents data and the primary encryption-resultant playback key data toward the kiosk terminal apparatus 5 via the equipments including the transmission server 2. After the step S5, the current execution cycle of the program segment ends.

In this way, the playback key data are encrypted by the steps S3 and S4. The encryption of the playback key data prohibits the decoding of the contents data if the combination of the sale header (the sale headers) and the contents data is altered.

Figure 8:
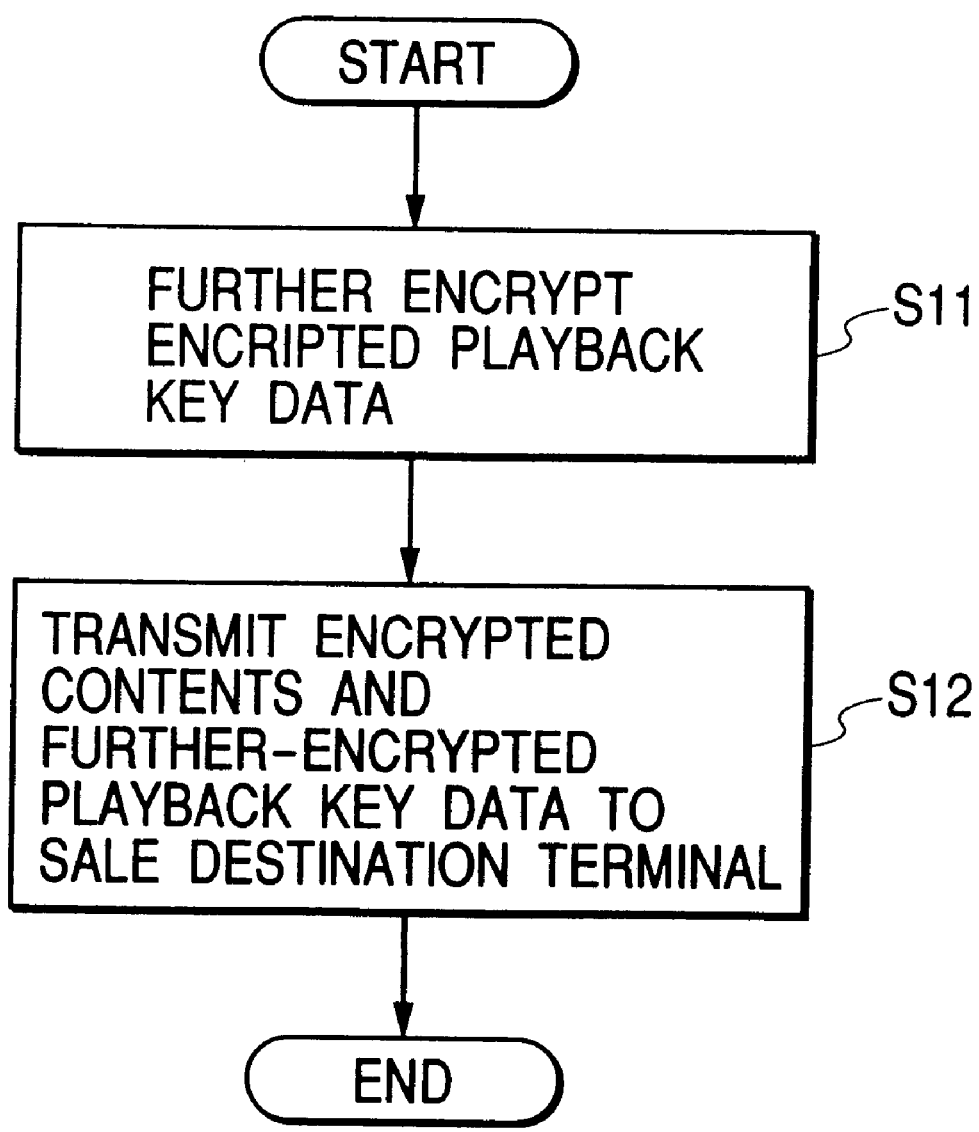
FIG. 8 is a flowchart of a segment of a control program for a computer in the kiosk terminal apparatus in FIG. 1.

As previously mentioned, the terminal apparatus 5 includes a computer which operates in accordance with a control program stored in a memory. FIG. 8 is a flowchart of a segment of the control program. As shown in FIG. 8, a first step S11 of the program segment further encrypts the primary encryption-resultant playback key data into secondary encryption-resultant playback key data in response to a transfer-destination player ID (a copy-destination player ID, that is, the ID of the customer's player 6a) according to DES. Here, DES is short for "data encryption standards".

A step S12 following the step S11 transmits the encryption-resultant contents data and the secondary encryption-resultant playback key data to the customer's player 6a. After the step S12, the current execution cycle of the program segment ends.

Figure 9:
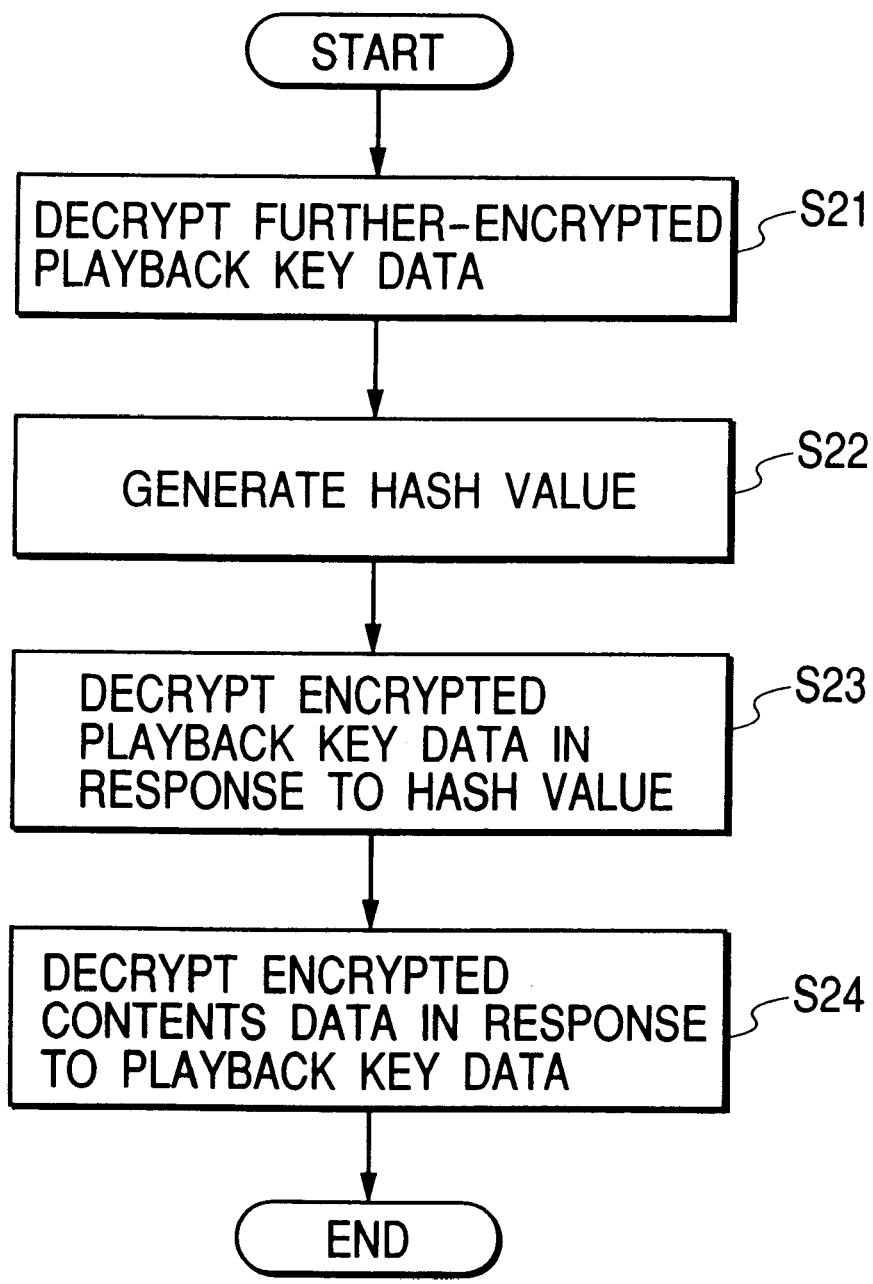
FIG. 9 is a flowchart of a first segment of a control program for a computer in the customer's player in FIG. 1.

As previously mentioned, the customer's player 6a includes a computer which operates in accordance with a control program stored in a memory. FIG. 9 is a flowchart of a segment of the control program. The program segment in FIG. 9 relates to descrambling encryption-resultant contents data. As shown in FIG. 9, a first step S21 of the program segment decrypts the secondary encryption-resultant playback key data into the primary encryption-resultant playback key data in response to the ID of the customer's player 6a according to DES for every sale header.

A step S22 following the step S21 generates 16-byte data of a hash value on the basis of a sequence of characters in each sale header in the designation item order and a sequence of characters in each sale sub header in the designation item order according to a hash function (MD5).

A step S23 subsequent to the step S22 executes Exclusive-OR operation between the primary encryption-resultant playback key data and the hash value data, thereby decrypting the primary encryption-resultant playback key data into the original playback key data for every sale header.

A step S24 following the step S23 executes Exclusive-OR operation between the encryption-resultant contents data and the original playback key data 16-byte by 16-byte, thereby decrypting or descrambling the encryption-resultant contents data into the compressed contents data. The step S24 expands the compressed contents data into the original contents data (the uncompressed contents data). The playback of the original contents data can be implemented in response to a customer's request. After the step S24, the current execution cycle of the program segment ends.

Figure 10:
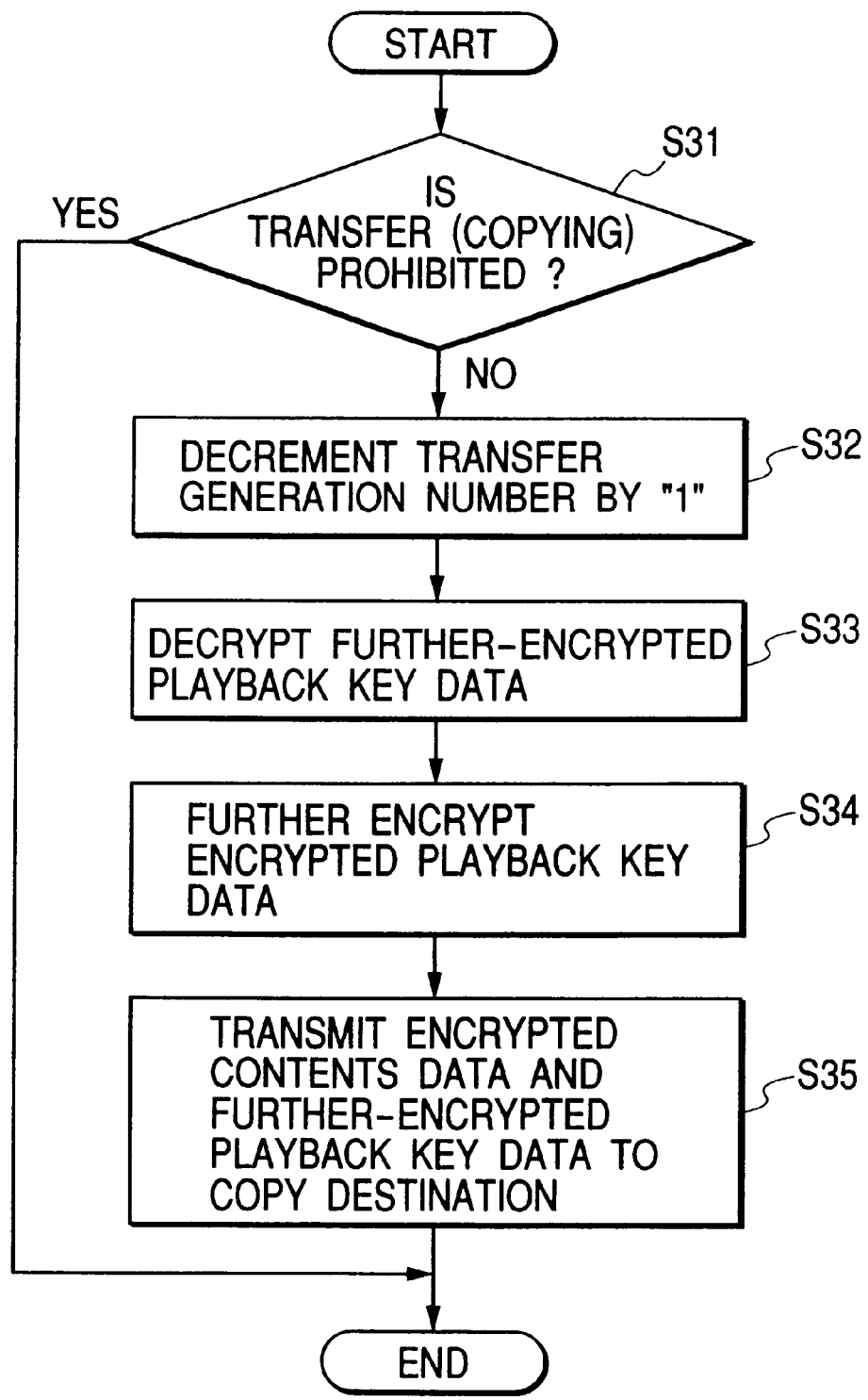
FIG. 10 is a flowchart of a second segment of a control program for a computer in the customer's player in FIG. 1.

FIG. 10 is a flowchart of another segment of the control program for the computer in the customer's player 6a. The program segment in FIG. 10 relates to transferring or copying data from the customer's player 6a to the customer's player 6b. As shown in FIG. 10, a first step S31 of the program segment refers to transfer control data in every sale header. The step S31 decides whether the transfer control data represents prohibition or permission concerning data transfer (copying). When the transfer control data represents prohibition, the program exits from the step S31 and then the current execution cycle of the program segment ends. On the other hand, when the transfer control data represents permission, the program advances from the step S31 to a step S32.

The step S32 decrements a transfer generation number (a copy generation number) represented by the transfer control data. The decrement corresponds to a number reduction of "1".

A step S33 following the step S32 decrypts the secondary encryption-resultant playback key data (transmitted from the kiosk terminal apparatus 5) into the primary encryption-resultant playback key data in response to the ID of the customer's player 6a according to DES for every sale header.

A step S34 subsequent to the step S33 encrypts the primary encryption-resultant playback key data into other secondary encryption-resultant playback key data or third encryption-resultant playback key data in response to the ID of the copy-destination player (the transfer-destination player) 6b.

A step S35 following the step S34 transmits the encryption-resultant contents data and the secondary encryption-resultant playback key data (generated by the step S34) to the copy-destination player 6b. The customer's player 6b recovers the original contents data as the customer's player 6a does (see FIG. 9). After the step S35, the current execution cycle of the program segment ends.

The customer's player 6a is designed to upload the transfer control data representative of the transfer generation number (the copy generation number) to a host side each time the transfer generation number is updated.

It should be noted that to update contents data (encryption-resultant contents data) stored in the kiosk terminal apparatus 5, the apparatus 5 may be periodically replaced with a new one.

Application software for the kiosk terminal apparatus 5 can be transmitted thereto from the uplink center 3 via the satellite 4.

Second Embodiment

Figure 11:
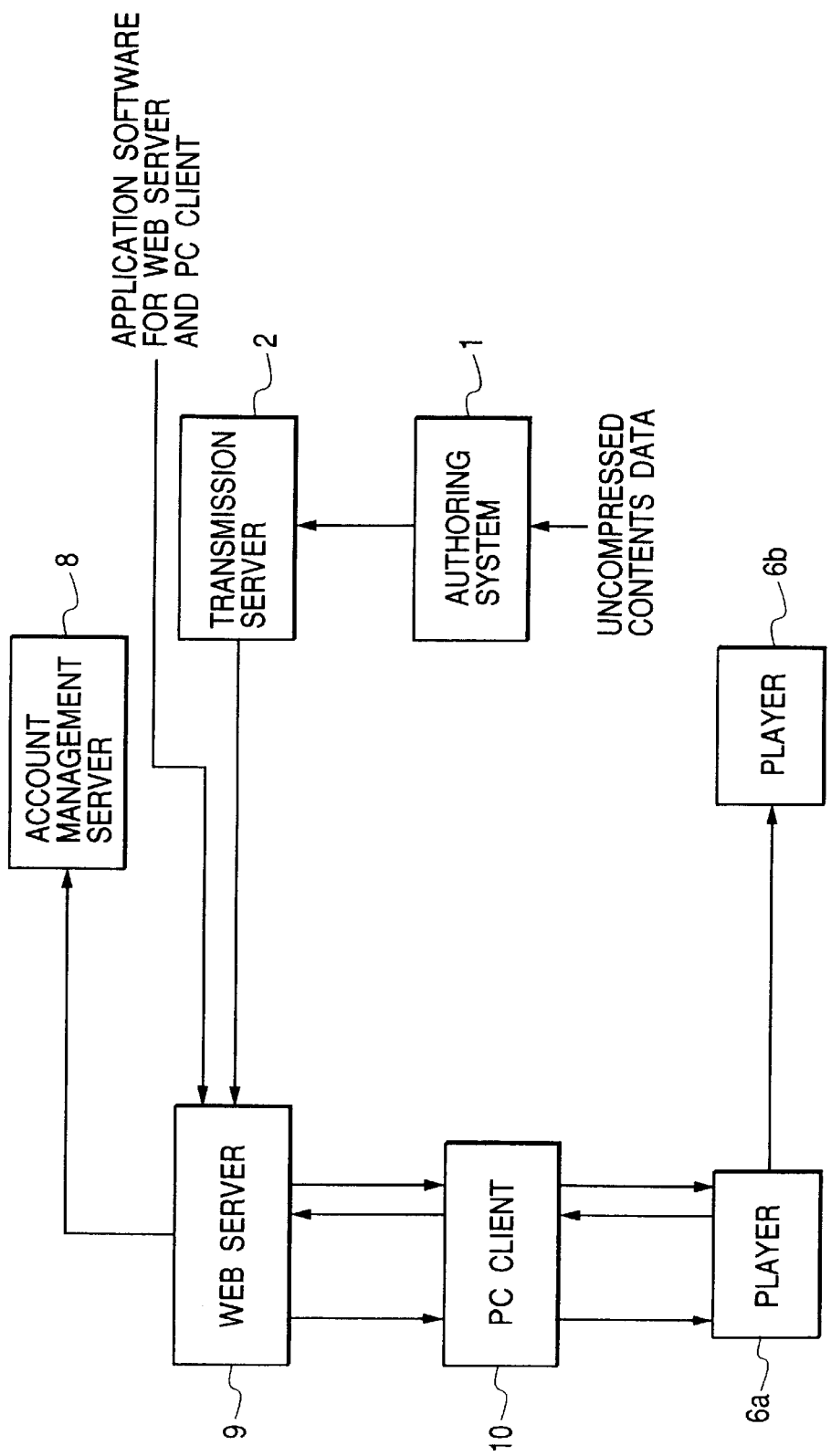
FIG. 11 is a block diagram of a contents sale system according to a second embodiment of this invention.

FIG. 11 shows a contents sale system according to a second embodiment of this invention. The contents sale system in FIG. 1 is similar to the contents sale system in FIG. 1 except for design changes mentioned hereinafter. It should be noted that the contents sale system in FIG. 1 and the contents sale system in FIG. 11 may be combined into a versatile contents sale system.

The contents sale system in FIG. 11 includes a web server 9 and a PC client 10 for Internet service. The web server 9 includes a computer which operates in accordance with a control program stored in a memory. The control program is designed to enable the web server 9 to implement processes mentioned later. The PC client 10 includes a computer which operates in accordance with a control program stored in a memory. The control program is designed to enable the PC client 10 to implement processes mentioned later. The web server 9 is connected to a transmission server 2 and an account management server 8. The web server 9 may also be connected to a management center MC (see FIG. 1). The PC client 10 can be connected to the web server 9 via the Internet. A customer's player 6a can be connected with the PC client 10 via an IEEE1394 interface.

Composite data of a given format which include encryption-resultant contents data and primary encryption-resultant playback key data (first encryption-resultant playback key data) are transmitted from an authoring system unit 1 to the web server 9 via the transmission server 2.

In the case where the customer's player 6a is connected with the PC client 10 via the IEEE1394 interface while the PC client 10 is connected with the web server 9 via the Internet, the player 6a informs the web server 9 of its own ID via the connection between them. The web server 9 encrypts the primary encryption-resultant playback key data into secondary encryption-resultant playback key data (second encryption-resultant playback key data) in response to the ID of the player 6a. The web server 9 downloads the encryption-resultant contents data and the secondary encryption-resultant playback key data to the player 6a via the PC client 10.

In the case where the customer's player 6a is connected with the PC client 10 via the IEEE1394 interface while the PC client 10 is connected with the web server 9 via the Internet, the player 6a transmits accounting information, which relates to a balance in the player 6a, to the account management server 8 via the connection between them.

FIGS. 12, 13, 14, 15, 16, and 17 show a sequence of communications among the web server 9, the PC client 10, and the customer's player 6a. In FIGS. 12–17, "Form 38", "Form 39", . . . denote forms of transmitted signals respectively.

Figure 12:
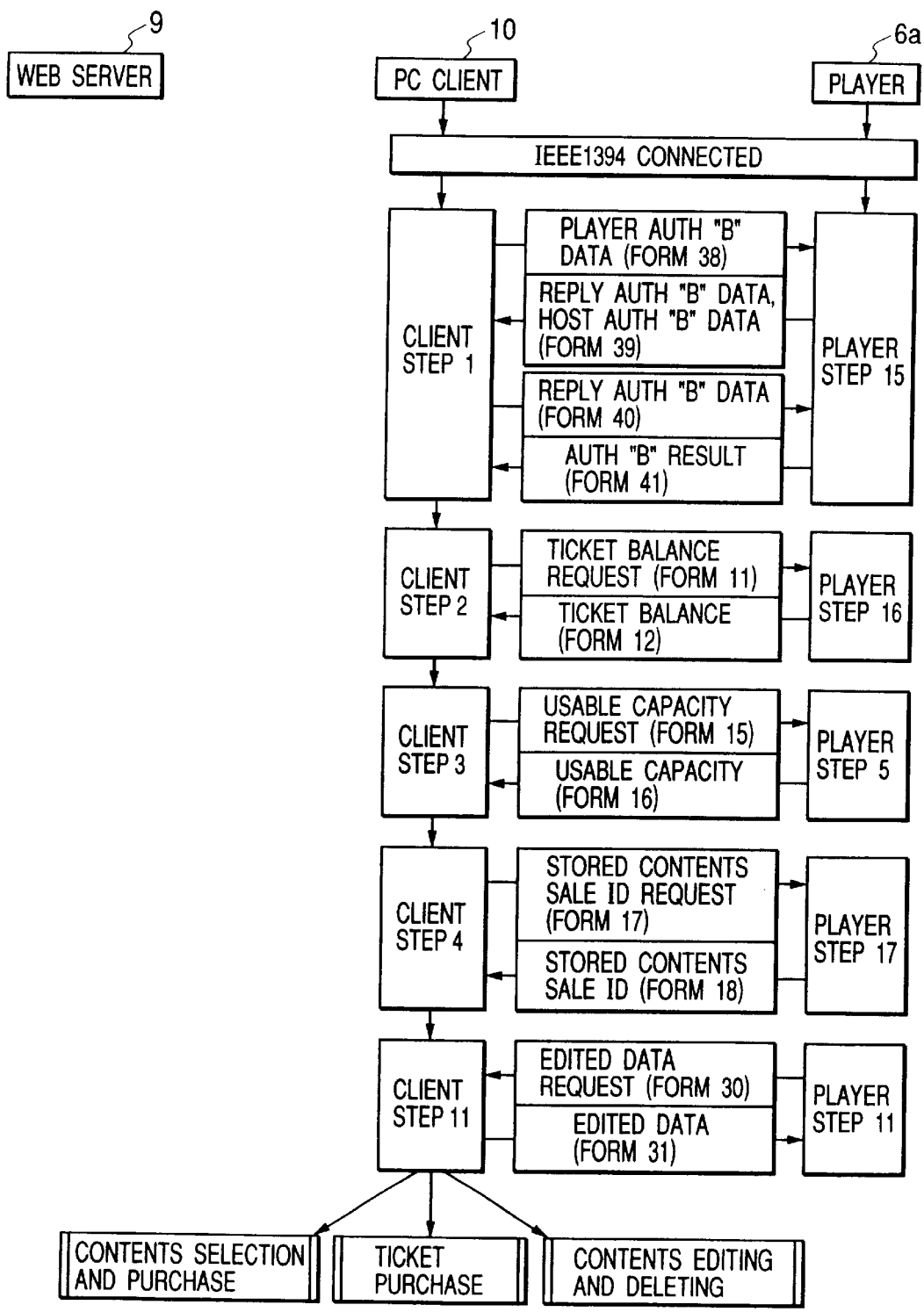
FIGS. 12, 13, 14, 15, 16, and 17 are diagrams showing a sequence of communications among a web server, a PC client, and a customer's player in FIG. 11.

With reference to FIG. 12, in the case where the customer's player 6a is connected with the PC client 10 via the IEEE1394 interface, the PC client 10 transmits player authentication "B" data of a form "38" to the customer's player 6a. In response to the player authentication "B" data, the customer's player 6a transmits reply player authentication "B" data and host authentication "B" data of a form "39" to the PC client 10. Then, the PC client 10 transmits reply host authentication "B" data of a form "40" to the customer's player 6a. In response to the reply host authentication "B" data, the customer's player 6a transmits a form-"41" signal of the result of host authentication "B" to the PC client 10.

Subsequently, the PC client 10 transmits a form-"11" signal of a ticket balance transmission request to the customer's player 6a. In response to the signal of the ticket balance transmission request, the customer's player 6a transmits a form-"12" signal of a ticket balance to the PC client 10. Then, the PC client 10 transmits a form-"15" signal of a usable-memory-capacity transmission request (an unoccupied-memory-capacity transmission request) to the customer's player 6a. In response to the signal of the usable-memory-capacity transmission request, the customer's player 6a transmits a form-"16" signal of a usable memory capacity (an unoccupied memory capacity) to the PC client 10. Thereafter, the PC client 10 transmits a form-"17" signal of a stored contents sale ID transmission request to the customer's player 6a. In response to the signal of the stored contents sale ID transmission request, the customer's player 6a transmits a form-"18" signal of a stored contents sale ID to the PC client 10. Then, the PC client 10 transmits a form-"30" signal of a request for transmission of edited data (data to be edited) to the customer's player 6a. In response to the signal of the edited data transmission request, the customer's player 6a transmits edited data (data to be edited) of a form "31" to the PC client 10. Subsequently, the communication sequence advances to one of a contents selection and purchase stage, a ticket purchase stage, and a contents editing and deleting stage in accordance with a user's request which is inputted by operating the PC client 10.

Figure 13:
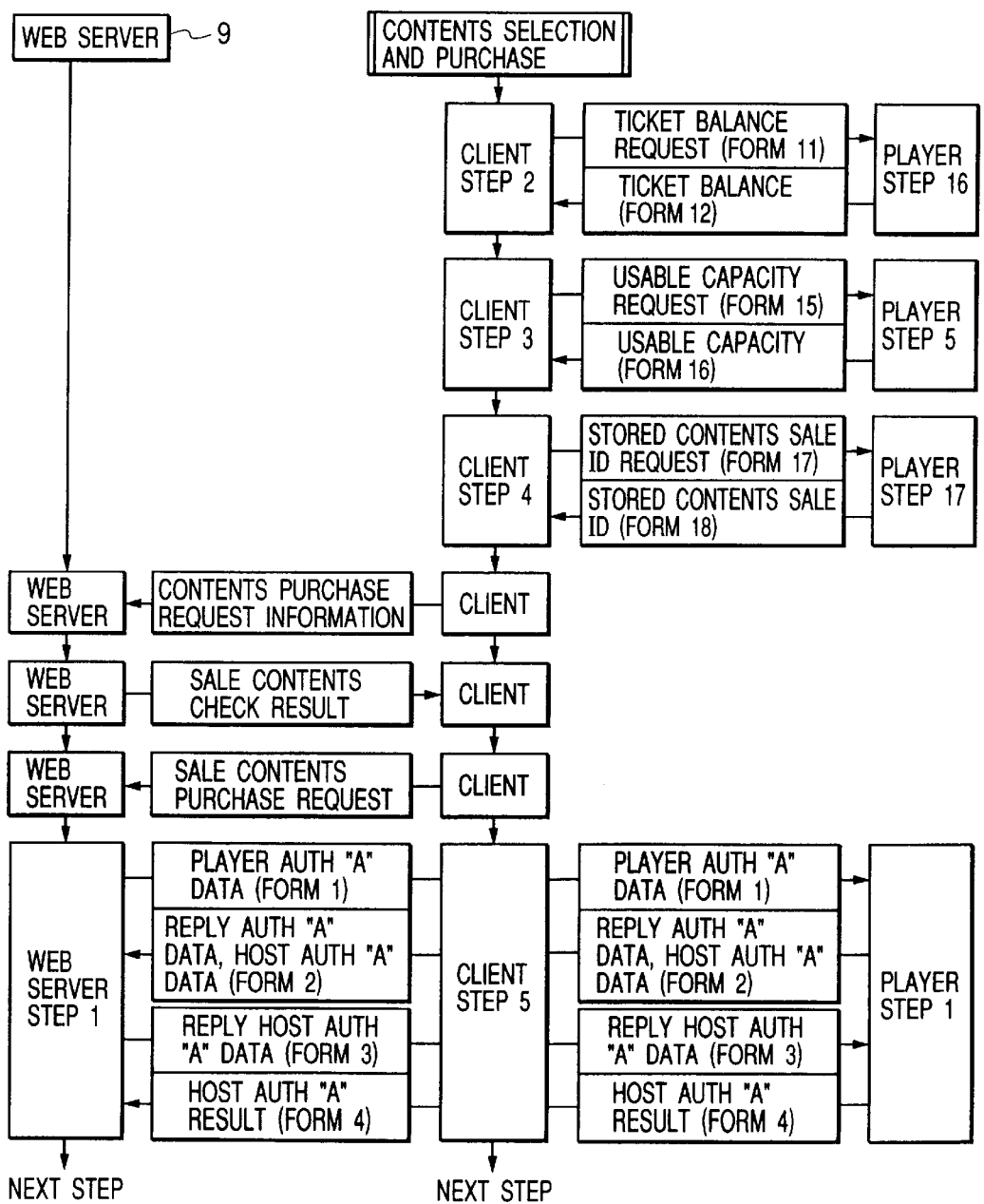

With reference to FIG. 13, during the contents selection and purchase stage, the PC client 10 transmits a form-"11" signal of a ticket balance transmission request to the customer's player 6a. In response to the signal of the ticket balance transmission request, the customer's player 6a transmits a form-"12" signal of a ticket balance to the PC client 10. Then, the PC client 10 transmits a form-"15" signal of a usable-memory-capacity transmission request (an unoccupied-memory-capacity transmission request) to the customer's player 6a. In response to the signal of the usable-memory-capacity transmission request, the customer's player 6a transmits a form-"16" signal of a usable memory capacity (an unoccupied memory capacity) to the PC client 10. Subsequently, the PC client 10 transmits a form-"17" signal of a stored contents sale ID transmission request to the customer's player 6a. In response to the signal of the stored contents sale ID transmission request, the customer's player 6a transmits a form-"18" signal of a stored contents sale ID to the PC client 10.

Then, the PC client 10 transmits contents purchase request information to the web server 9. Next, the web server 9 transmits a signal of a sale contents check result to the PC client 10. Thereafter, the PC client 10 transmits a signal of a contents purchase request to the web server 9. The web server 9 transmits player authentication "A" data of a form "1" to the PC client 10, and the PC client 10 transmits the player authentication "A" data to the customer's player 6a. In response to the player authentication "A" data, the customer's player 6a transmits reply player authentication "A" data and host authentication "A" data of a form "2" to the PC client 10. Then, the PC client 10 transmits the reply player authentication "A" data and the host authentication "A" data to the web server 9. Next, the web server 9 transmits reply host authentication "A" data of a form "3" to the PC client 10, and the PC client 10 transmits the reply host authentication "A" data to the customer's player 6a. In response to the reply host authentication "A" data, the customer's player 6a transmits a form-"4" signal of the result of host authentication "A" to the PC client 10. Then, the PC client 10 transmits the signal of the host authentication "A" result to the web server 9.

Figure 14:
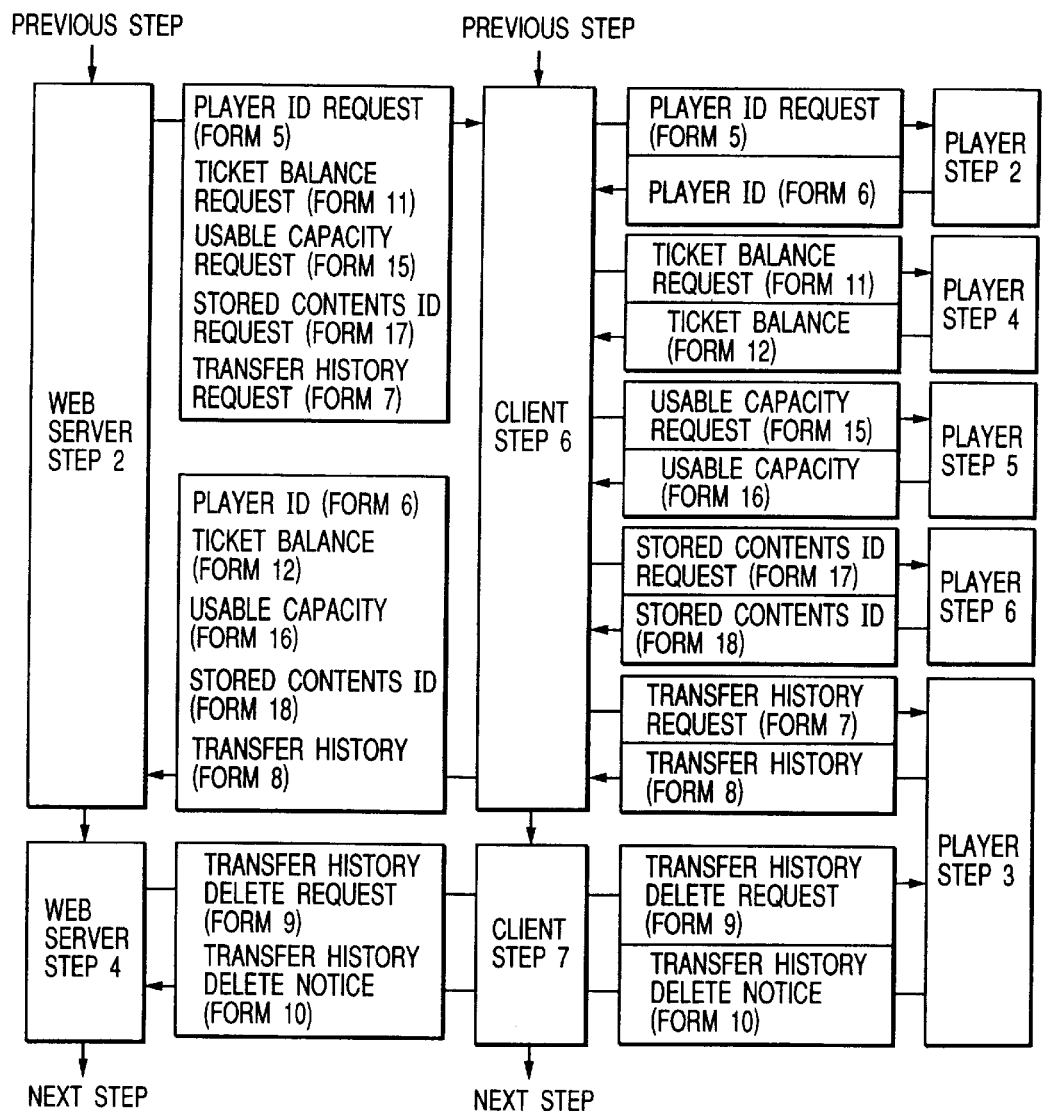

Subsequently, as shown in FIG. 14, the web server 9 transmits a form-"5" signal of a player ID transmission request, a form-"11" signal of a ticket balance transmission request, a form-"15" signal of a usable-memory-capacity transmission request (an unoccupied-memory-capacity transmission request), a form-"17" signal of a stored contents sale ID transmission request, and a form-"7" signal of a transfer history transmission request (a copy history transmission request) to the PC client 10. Then, the PC client 10 transmits the signal of the player ID transmission request to the customer's player 6a. In response to the signal of the player ID transmission request, the customer's player 6a transmits a form-"6" signal of its own player ID to the PC client 10. Then, the PC client 10 transmits the signal of the ticket balance transmission request to the customer's player 6a. In response to the signal of the ticket balance transmission request, the customer's player 6a transmits a form-"12" signal of a ticket balance to the PC client 10. Next, the PC client 10 transmits the signal of the usable-memory-capacity transmission request (the unoccupied-memory-capacity transmission request) to the customer's player 6a. In response to the signal of the usable-memory-capacity transmission request, the customer's player 6a transmits a form-"16" signal of a usable memory capacity (an unoccupied memory capacity) to the PC client 10. Subsequently, the PC client 10 transmits the signal of the stored contents sale ID transmission request to the customer's player 6a. In response to the signal of the stored contents sale ID transmission request, the customer's player 6a transmits a form "18" signal of a stored contents sale ID to the PC client 10. Next, the PC client 10 transmits the signal of the transfer history transmission request (the copy history transmission request) to the customer's player 6a. In response to the signal of the transfer history transmission request, the customer's player 6a transmits a form-"8" signal of a transfer history (a copy history) to the PC client 10. Thereafter, the PC client 10 transmits the signal of the player ID, the signal of the ticket balance, the signal of the usable memory capacity, the signal of the stored contents sale ID, and the signal of the transfer history to the web server 9.

Subsequently, the web server 9 transmits a form-"9" signal of a transfer history deletion request (a copy history deletion request) to the PC client 10, and the PC client 10 transmits the signal of the transfer history deletion request to the customer's player 6a. In response to the signal of the transfer history deletion request, the customer's player 6a transmits a form-"10" signal of a transfer history deletion notice (a copy history deletion notice) to the PC client 10. Then, the PC client 10 transmits the signal of the transfer history deletion notice to the web server 9.

Figure 15:
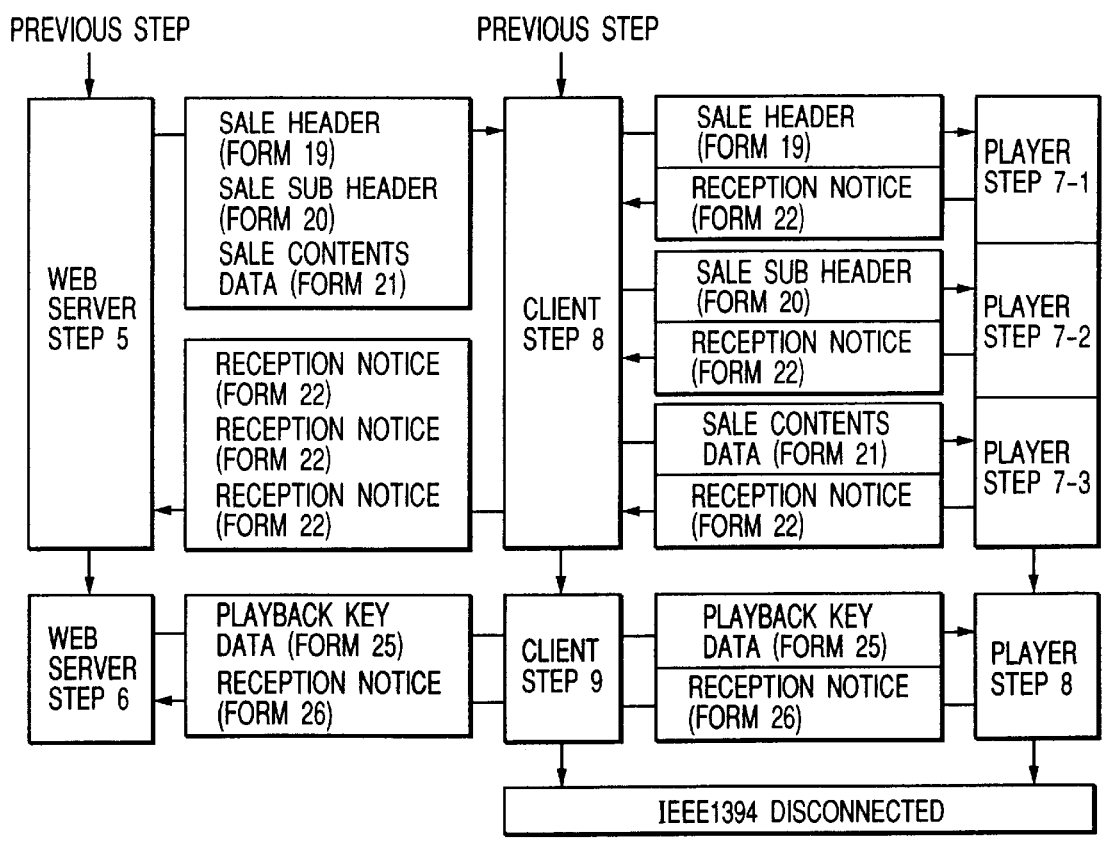

Next, as shown in FIG. 15, the web server 9 transmits a sale header of a form "19", a sale sub header of a form "20", and contents data (encryption-resultant contents data) of a form "21" to the PC client 10. Subsequently, the PC client 10 transmits the sale header to the customer's player 6a. The customer's player 6a transmits a form-"22" signal of a data reception notice to the PC client 10 when successfully receiving the sale header. Then, the PC client 10 transmits the sale sub header to the customer's player 6a. The customer's player 6a transmits a form-"22" signal of a data reception notice to the PC client 10 when successfully receiving the sale sub header. Next, the PC client 10 transmits the contents data (the encryption-resultant contents data) to the customer's player 6a. The customer's player 6a transmits a form-"22" signal of a data reception notice to the PC client 10 when successfully receiving the contents data. The PC client 10 transmits the signals of the data reception notices, which have been received from the customer's player 6a, to the web server 9.

Subsequently, the web server 9 transmits playback key data (secondary encryption-resultant playback key data) of a form "25" to the PC client 10, and the PC client 10 transmits the playback key data to the customer's player 6a. The customer's player 6a transmits a form-"26" signal of a data reception notice to the PC client 10 when successfully receiving the playback key data. The PC client 10 transmits the signal of the data reception notice to the web server 9. Thereafter, the customer's player 6a is disconnected from the PC client 10. In other words, the IEEE1394 interface between the PC client 10 and the customer's player 6a is disconnected.

Figure 16:
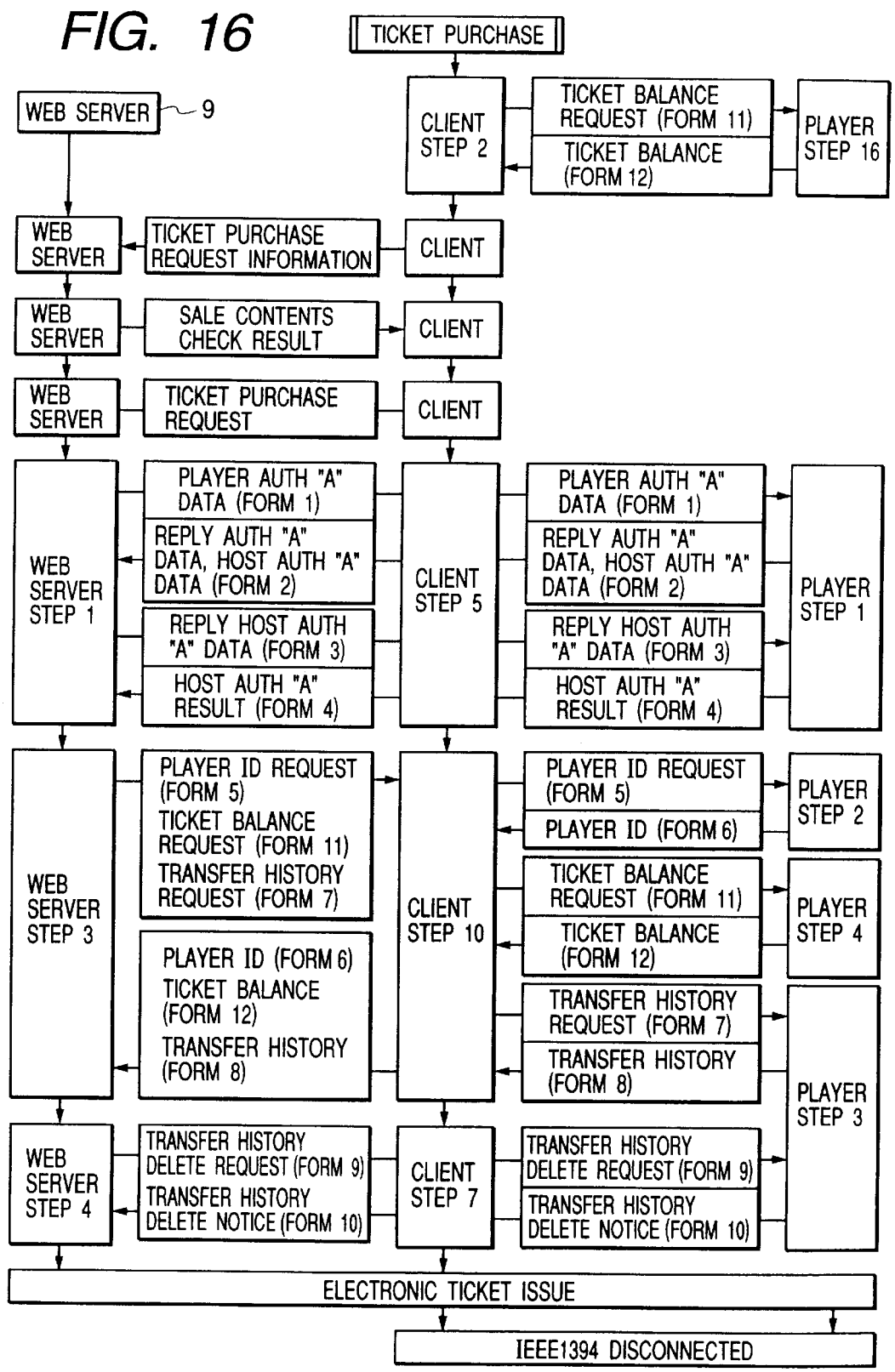

With reference to FIG. 16, during the ticket purchase stage, the PC client 10 transmits a form-"11" signal of a ticket balance transmission request to the customer's player 6a. In response to the signal of the ticket balance transmission request, the customer's player 6a transmits a form-"12" signal of a ticket balance to the PC client 10. Then, the PC client 10 transmits ticket purchase request information to the web server 9. Next, the web server 9 transmits a signal of a sale contents check result to the PC client 10.

Subsequently, the PC client 10 transmits a signal of a ticket purchase request to the web server 9. Thereafter, the web server 9 transmits player authentication "A" data of the form "1" to the PC client 10, and the PC client 10 transmits the player authentication "A" data to the customer's player 6a. In response to the player authentication "A" data, the customer's player 6a transmits reply player authentication "A" data and host authentication "A" data of the form "2" to the PC client 10. Then, the PC client 10 transmits the reply player authentication "A" data and the host authentication "A" data to the web server 9. Next, the web server 9 transmits reply host authentication "A" data of the form "3" to the PC client 10, and the PC client 10 transmits the reply host authentication "A" data to the customer's player 6a. In response to the reply host authentication "A" data, the customer's player 6a transmits a form-"4" signal of the result of host authentication "A" to the PC client 10. Then, the PC client 10 transmits the signal of the host authentication "A" result to the web server 9.

Next, the web server 9 transmits a form-"5" signal of a player ID transmission request, a form-"11" signal of a ticket balance transmission request, and a form-"7" signal of a transfer history transmission request (a copy history transmission request) to the PC client 10. Then, the PC client 10 transmits the signal of the player ID transmission request to the customer's player 6a. In response to the signal of the player ID transmission request, the customer's player 6a transmits a form-"6" signal of its own player ID to the PC client 10. Then, the PC client 10 transmits the signal of the ticket balance transmission request to the customer's player 6a. In response to the signal of the ticket balance transmission request, the customer's player 6a transmits a form-"12" signal of a ticket balance to the PC client 10. Next, the PC client 10 transmits the signal of the transfer history transmission request (the copy history transmission request) to the customer's player 6a. In response to the signal of the transfer history transmission request, the customer's player 6a transmits a form-"8" signal of a transfer history (a copy history) to the PC client 10. Thereafter, the PC client 10 transmits the signal of the player ID, the signal of the ticket balance, and the signal of the transfer history to the web server 9.

Subsequently, the web server 9 transmits a form-"9" signal of a transfer history deletion request (a copy history deletion request) to the PC client 10, and the PC client 10 transmits the signal of the transfer history deletion request to the customer's player 6a. In response to the signal of the transfer history deletion request, the customer's player 6a transmits a form-"10" signal of a transfer history deletion notice (a copy history deletion notice) to the PC client 10. Then, the PC client 10 transmits the signal of the transfer history deletion notice to the web server 9. Next, an electronic ticket issuing process of a form "37" is implemented. Thereafter, the customer's player 6a is disconnected from the PC client 10. In other words, the IEEE1394 interface between the PC client 10 and the customer's player 6a is disconnected.

Figure 17:
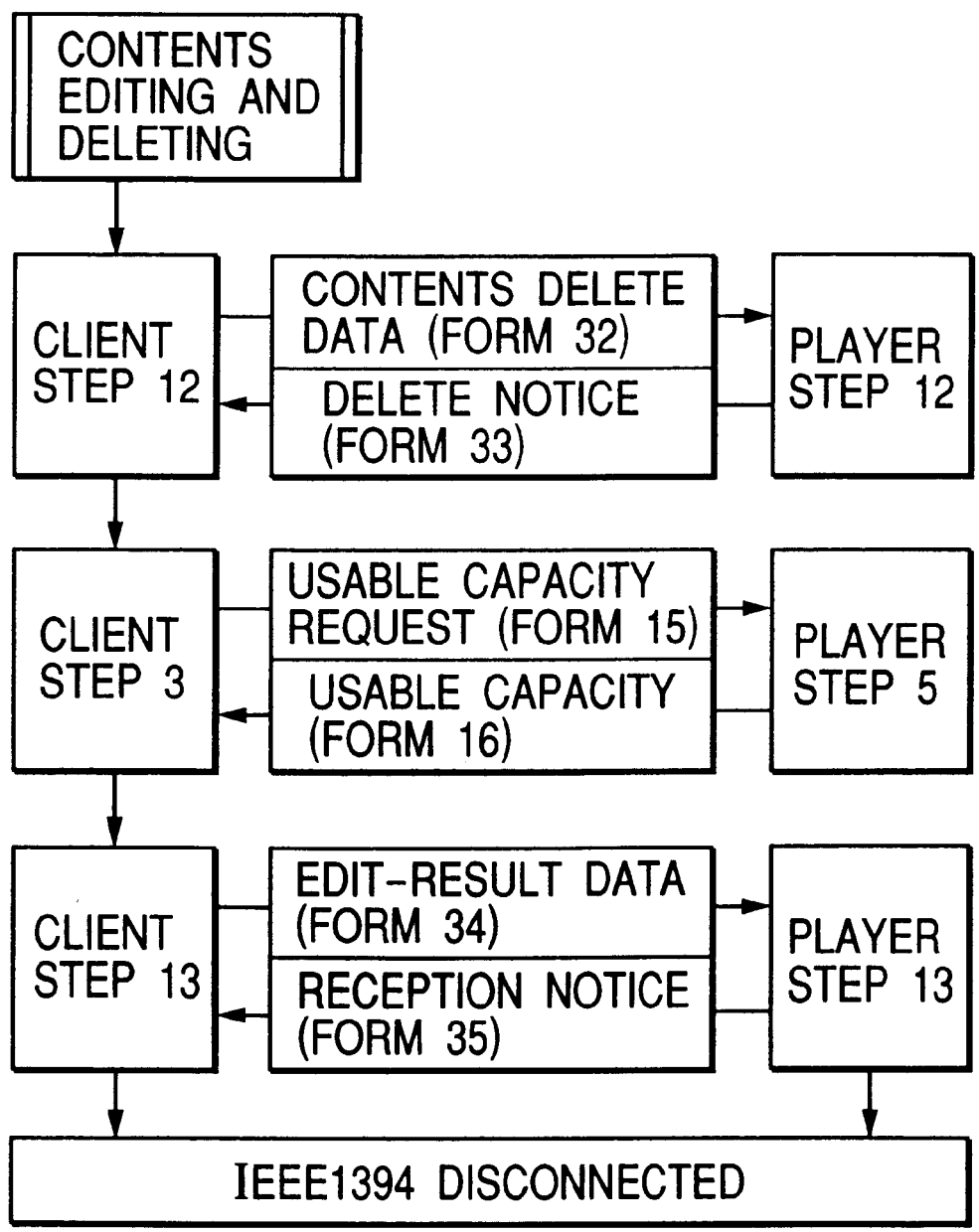

The contents editing and deleting stage is implemented while the customer's player 6a remains connected with the PC client 10 but the PC client 10 continues to be out of connection with the web server 9. With reference to FIG. 17, during the contents editing and deleting stage, the PC client 10 transmits contents deletion data of a form "32" to the customer's player 6a. In response to the contents deletion data, the customer's player 6a transmits a form-"33" signal of a contents deletion notice to the PC client 10. Subsequently, the PC client 10 transmits a form-"15" signal of a usable-memory-capacity transmission request (an unoccupied-memory-capacity transmission request) to the customer's player 6a. In response to the signal of the usable-memory-capacity transmission request, the customer's player 6a transmits a form-"16" signal of a usable memory capacity (an unoccupied memory capacity) to the PC client 10. Then, the PC client 10 transmits editing-resultant data of a form "34" to the customer's player 6a. The customer's player 6a transmits a form-"35" signal of a data reception notice to the PC client 10 when successfully receiving the editing-resultant data. Thereafter, the customer's player 6a is disconnected from the PC client 10. In other words, the IEEE1394 interface between the PC client 10 and the customer's player 6a is disconnected.

Third Embodiment

A third embodiment of this invention is similar to one of the first embodiment (see FIGS. 1–10) and the second embodiment (see FIGS. 11–17) thereof, or a combination of the first and second embodiments thereof except for design changes mentioned hereinafter. In the third embodiment of this invention, the forms of signals transmitted between a kiosk terminal apparatus 5 and a customer's player 6a, and the forms of signals transmitted among a web server 9, a PC client 10, and a customer's player 6a are of first and second types corresponding to first and second basic formats respectively.

Figure 18:
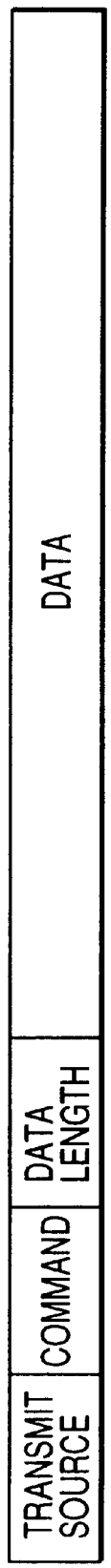
FIG. 18 is a diagram of a first basic format of transmitted signals in a third embodiment of this invention.

FIG. 18 shows the first basic format of transmitted signals. As shown in FIG. 18, a signal of the first basic format has a sequence of a code word (an ID code word) representing a transmission source, a code word representing a command, and an information piece representing the length of data (encryption-resultant data). The data-length information piece is followed by the data (the encryption-resultant data). The ID code word is added to the transmitted signal by the transmission source. The first basic format is used for data-added transmitted signals.

Figure 19:
FIG. 19 is a diagram of a second basic format of transmitted signals in the third embodiment of this invention.

FIG. 19 shows the second basic format of transmitted signals. As shown in FIG. 19, a signal of the second basic format has a sequence of a code word (an ID code word) representing a transmission source, a code word representing a command, and an information piece representing a data length of "0". The ID code word is added to the transmitted signal by the transmission source. The second basic format is used for data-less transmitted signals such as transmitted signals representing requests or notices.

FIG. 20 shows a list of code words (ID code words) representing transmission sources. As shown in FIG. 20, a code word "A00h" is assigned to a customer's player 6a. A code word "A01h" is assigned to a kiosk terminal apparatus 5. A code word "A02h" is assigned to a settlement box 7. A code word "A03h" is assigned to an Internet contents management portion. A code word "A04h" is assigned to an Internet settlement management portion. A code word "A05h" is assigned to a ticket server. A code word "A06h" is assigned to a kiosk working management server. A code word "A07h" is assigned to an account management server 8. A code word "A08h" is assigned to an Internet PC client 10. A code word "A09h" is assigned to a transmission server 2. A code word "A0Ah" is assigned to an authoring system unit 1. Code words "A0Bh", "A0Ch", "A0Dh", "A0Eh", and "A0Fh" are reserved.

FIG. 21 shows a first list of code words representing commands (or transmitted-signal types) including requests, notices, and others. As shown in FIG. 21, a code word "B00h" is assigned to player authentication "A" data transmission A code word "B01h" is assigned to reply host authentication "A" data transmission. A code word "B02h" is assigned to a player ID transmission request. A code word "B03h" is assigned to a transfer history transmission request. A code word "B04h" is assigned to a transfer history deletion request. A code word "B05h" is assigned to a ticket balance transmission request. A code word "B06h" is assigned to a ticket issue end notice. Code words "B07h" and "B08h" are reserved. A code word "B09h" is assigned to a usable-memory-capacity transmission request. A code word "B0Ah" is assigned to a stored contents sale ID transmission request. A code word "B0Bh" is assigned to sale header transmission. A code word "B0Ch" is assigned to sale sub header transmission. A code word "B0Dh" is assigned to sale contents data transmission. A code words "B0Eh" is reserved. A code word "B0Fh" is assigned to playback key data transmission. A code word "B10h" is assigned to reply player authentication "A" data and host authentication "A" data transmission. A code word "B11h" is assigned to host authentication "A" result transmission. A code word "B12h" is assigned to player ID transmission. A code word "B13h" is assigned to transfer history transmission. A code word "B14h" is assigned to a transfer history deletion notice. A code word "B15h" is assigned to ticket balance transmission. A code word "B16h" is assigned to a ticket issue reception notice. Code words "B17h" and "B18h" are reserved. A code word "B19h" is assigned to usable-memory-capacity transmission. A code word "B1Ah" is assigned to stored contents sale ID transmission.

FIG. 22 shows a second list of code words representing commands (or transmitted-signal types) including requests, notices, and others. As shown in FIG. 22, code words "B1Bh" and "B1Ch" are reserved. A code word "B1Dh" is assigned to a playback key data reception notice. A code word "B1Eh" is assigned to player authentication "B" data transmission. A code word "B1Fh" is assigned to reply host authentication "B" data transmission. A code word "B20h" is assigned to an edited data transmission request. A code word "B21h" is assigned to contents deletion data transmission. A code word "B22h" is assigned to editing-resultant data transmission. Code words "B23h", "B24h", "B25h", "B26h", and "B27h" are reserved. A code word "B28h" is assigned to edited data transmission. A code word "B29h" is assigned to a sale contents data deletion notice. A code word "B2Ah" is assigned to an editing-resultant data reception notice. Code words "B2Bh", "B2Ch", and "B2Dh" are reserved. A code word "B2Eh" is assigned to reply player authentication "B" data and host authentication "B" data transmission. A code word "B2Fh" is assigned to host authentication "B" result transmission. Code words "B30h" to "BDFh" are reserved. A code word "BE0H" is reserved. A code word "BE1h" is assigned to a data reception notice. A code word "BE2h" is assigned to a command reception notice. A code word "BE3h" is assigned to a command retransmission request. A code word "BE4h" is assigned to stand-by command transmission. Code words "BE5h", "BE6h", "BE7h", "BE8h", and "BE9h" are reserved. A code word "BEAh" is assigned to electronic ticket transmission. Code words "BEBh", "BECh", "BEDh", and "BEEh" are reserved. A code word "BEFh" is assigned to discontinuing command transmission.

FIG. 23 is a flowchart of a segment of a control program for a computer in the customer's player 6a. The program segment in FIG. 23 relates to slave reply transmission from the customer's player according to a communication system in which a contents transmission source (the kiosk terminal apparatus 5 or the PC client 10) acts as a master while the customer's player 6a operates as a slave. The control program segment in FIG. 23 is designed so that the customer's player 6a transmits data or a command to the contents transmission source only when receiving a related transmission request therefrom. In other words, the customer's player 6a is inhibited from spontaneously transmitting data or a command to the contents transmission source.

As shown in FIG. 23, a first step S41 of the program segment decides whether or not a signal of a transmission request has come from a contents transmission source. When a transmission request signal has not come, the program exits from the step S41 and then the current execution cycle of the program segment ends. On the other hand, when a transmission request signal has come, the program advances from the step S41 to a step S42.

The step S42 implements a process of preparing and providing a transmission object (data or a command) designated by the transmission request signal. The step S42 selects a signal form in accordance with the transmission object. The step S42 formats the transmission object into the selected form.

A step S43 following the step S42 transmits the transmission object of the selected form to the contents transmission source as a reply to the transmission request signal. After the step S43, the current execution cycle of the program segment ends.

Fourth Embodiment

A fourth embodiment of this invention is similar to one of the second embodiment (see FIGS. 11–17) and the third embodiment (see FIGS. 18–23) thereof except for design changes mentioned hereinafter.

Figure 24:
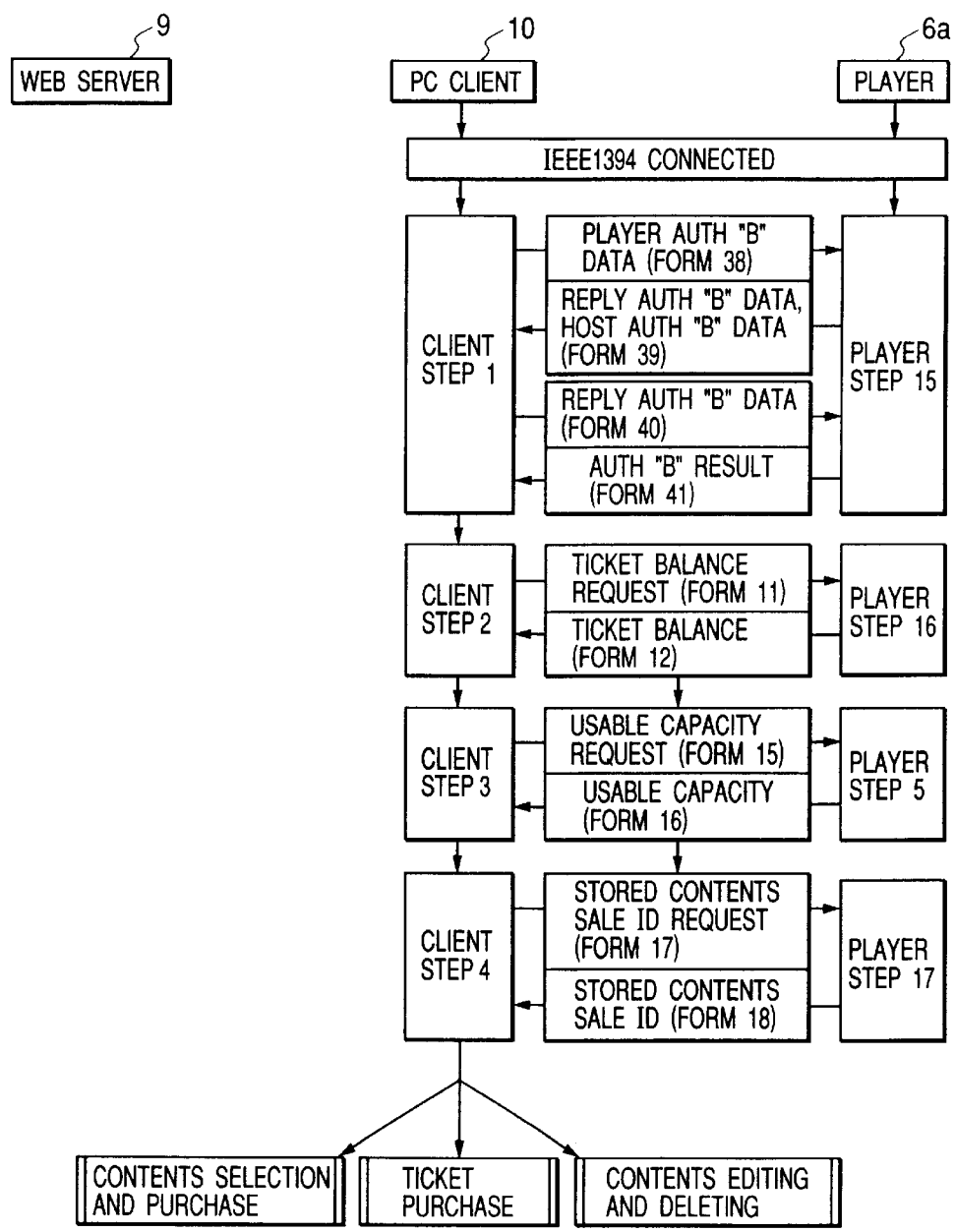
FIGS. 24 and 25 are diagrams showing a sequence of communications among a web server, a PC client, and a customer's player in a fourth embodiment of this invention.
Figure 25:
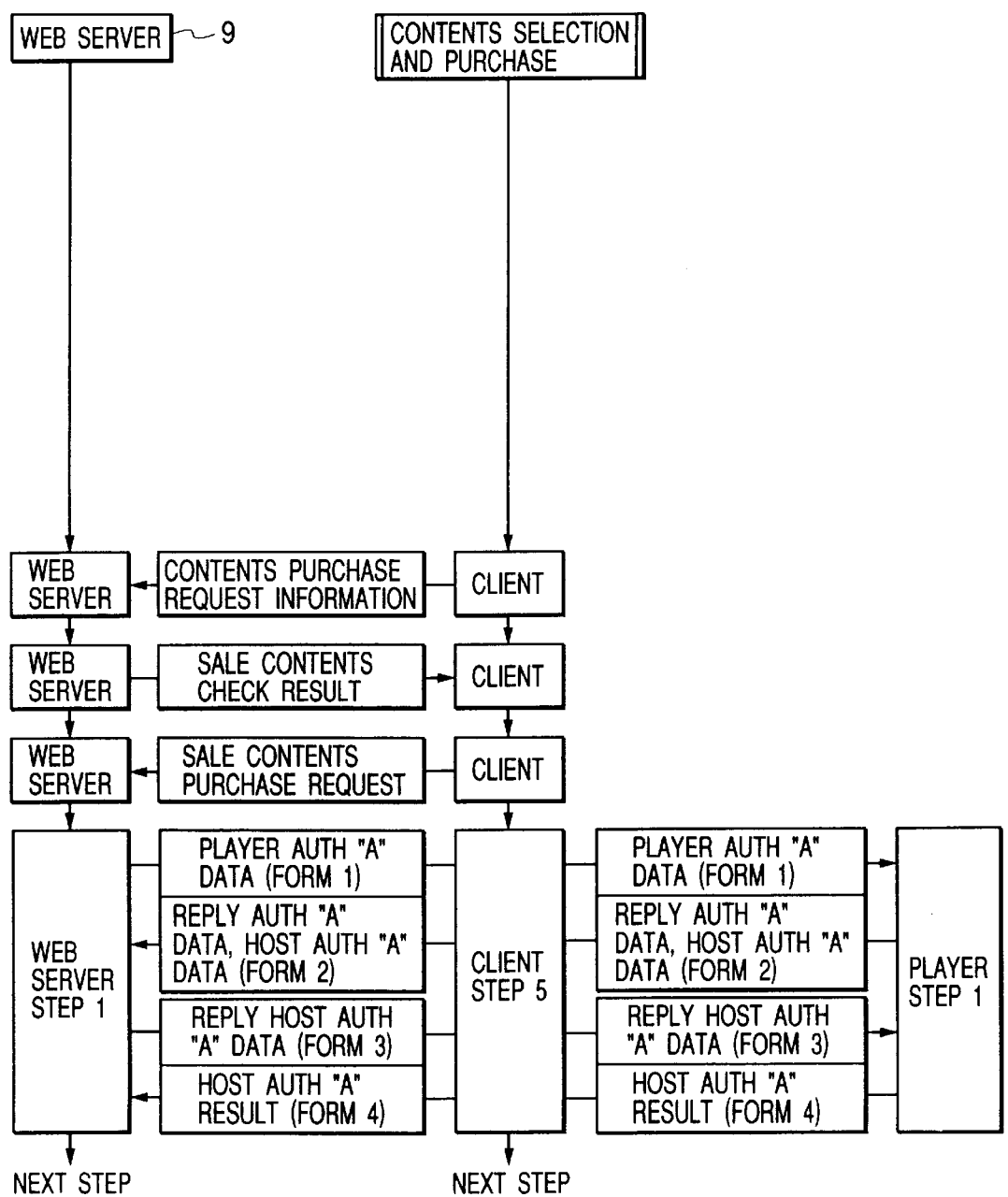

FIGS. 24 and 25 show a portion of a sequence of communications among a web server 9, a PC client 10, and a customer's player 6a according to the third embodiment of this invention. In FIGS. 24 and 25, "Form 38", "Form 39", . . . denote predetermined forms (formats) of transmitted signals respectively.

With reference to FIG. 24, in the case where the customer's player 6a is connected with the PC client 10 via an IEEE1394 interface, the PC client 10 transmits player authentication "B" data of a form "38" to the customer's player 6a. In response to the player authentication "B" data, the customer's player 6a transmits reply player authentication "B" data and host authentication "B" data of a form "39" to the PC client 10. Then, the PC client 10 transmits reply host authentication "B" data of a form "40" to the customer's player 6a. In response to the reply host authentication "B" data, the customer's player 6a transmits a form-"41" signal of the result of host authentication "B" to the PC client 10.

Subsequently, the PC client 10 transmits a form-"11" signal of a ticket balance transmission request to the customer's player 6a. In response to the signal of the ticket balance transmission request, the customer's player 6a transmits a form-"12" signal of a ticket balance to the PC client 10. Then, the PC client 10 transmits a form-"15" signal of a usable-memory-capacity transmission request (an unoccupied-memory-capacity transmission request) to the customer's player 6a. In response to the signal of the usable-memory-capacity transmission request, the customer's player 6a transmits a form-"16" signal of a usable memory capacity (an unoccupied memory capacity) to the PC client 10. Thereafter, the PC client 10 transmits a form-"17" signal of a stored contents sale ID transmission request to the customer's player 6a. In response to the signal of the stored contents sale ID transmission request, the customer's player 6a transmits a form-"18" signal of a stored contents sale ID to the PC client 10. Then, the communication sequence advances to one of a contents selection and purchase stage, a ticket purchase stage, and a contents editing and deleting stage in accordance with a user's request which is inputted by operating the PC client 10.

With reference to FIG. 25, during the contents selection and purchase stage, the PC client 10 transmits contents purchase request information to the web server 9. Next, the web server 9 transmits a signal of a sale contents check result to the PC client 10. Thereafter, the PC client 10 transmits a signal of a contents purchase request to the web server 9. The web server 9 transmits player authentication "A" data of a form "1" to the PC client 10, and the PC client 10 transmits the player authentication "A" data to the customer's player 6a. In response to the player authentication "A" data, the customer's player 6a transmits reply player authentication "A" data and host authentication "A" data of a form "2" to the PC client 10. Then, the PC client 10 transmits the reply player authentication "A" data and the host authentication "A" data to the web server 9. Next, the web server 9 transmits reply host authentication "A" data of a form "3" to the PC client 10, and the PC client 10 transmits the reply host authentication "A" data to the customer's player 6a. In response to the reply host authentication "A" data, the customer's player 6a transmits a form-"4" signal of the result of host authentication "A" to the PC client 10. Then, the PC client 10 transmits the signal of the host authentication "A" result to the web server 9.

Fifth Embodiment

A fifth embodiment of this invention is similar to one of the first embodiment (see FIGS. 1–10), the second embodiment (see FIGS. 11–17), the third embodiment (see FIGS. 18–23), and the fourth embodiment (see FIGS. 24 and 25) thereof except for design changes mentioned hereinafter.

FIG. 26 shows the structure of a sale header provided and added by an authoring system unit 1 (see FIGS. 1 and 11) during a mastering process. Besides items in the sale header of FIG. 2, the sale header 26 contains an information piece of a manufactured article title, information pieces of the names of N tunes, information pieces of the names of artists of the N tunes, and information pieces of ISRC (International Standard Recording Code) of the N tunes.

With reference to FIG. 27, bytes of a sale sub header are sequentially assigned to indications of different items as follows.

1 byte of a sub header version;
1 byte of a sub header size;
1 byte reserved;
1 byte of transfer control data;
8 bytes of a contents sale ID;
8 bytes of a transmission source ID;
2 bytes of a sale ticket number;
1 byte of a designated tune order number; and
32 bytes of a manufactured article title.

Figure 28:
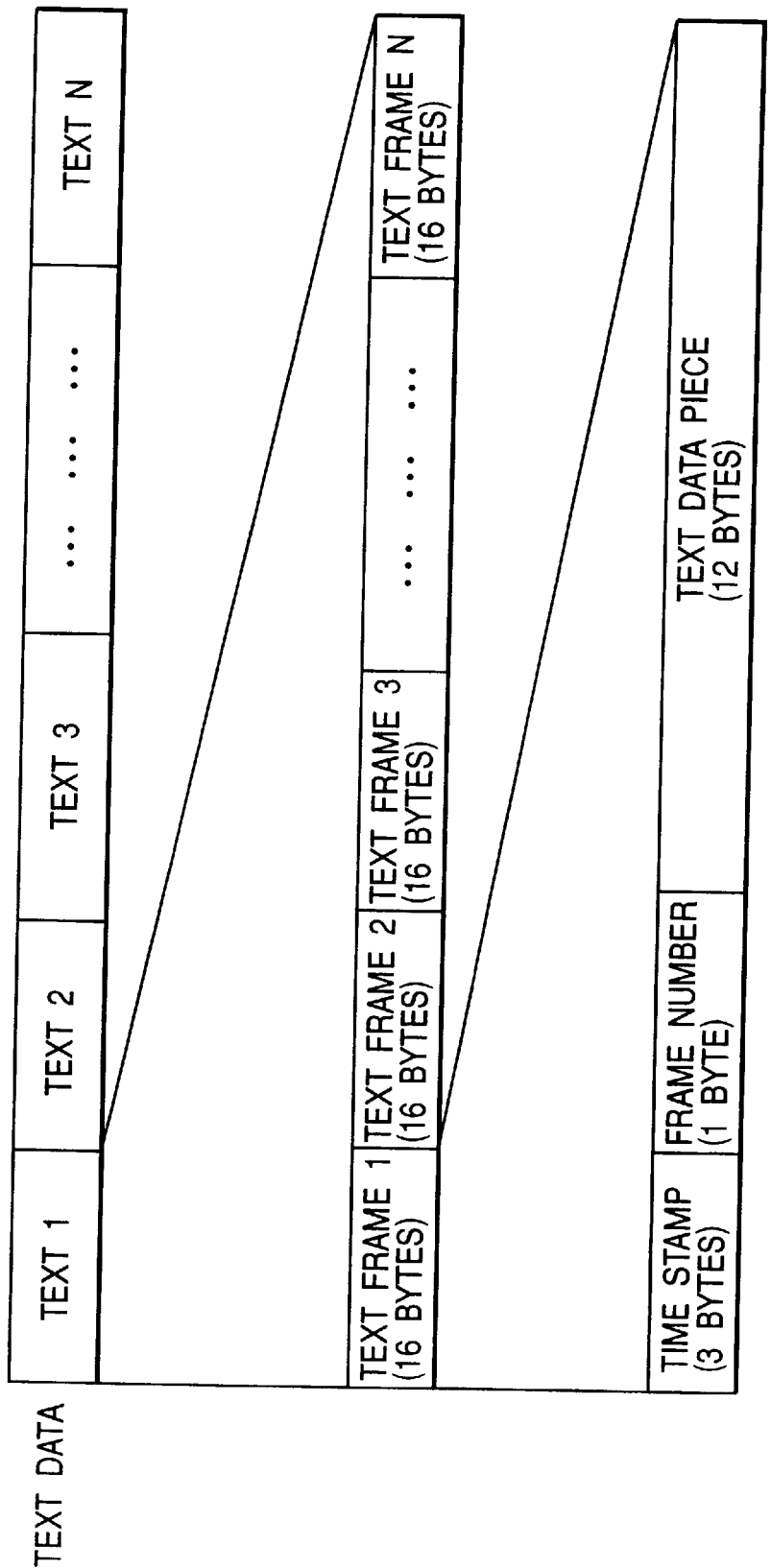
FIG. 28 is a diagram of a format of text data in the fifth embodiment of this invention.

Text data is of a given format mentioned hereinafter. As shown in FIG. 28, text data of the given format is divided into segments (1-text-corresponding segments) corresponding to texts "1", "2", "3", . . . , and "N" respectively. Here, "N" denotes a predetermined natural number. Every 1-text-corresponding segment is composed of N successive text frames each having 16 bytes. Each text frame has a sequence of 3 bytes representing a time stamp, 1 byte representing a frame number, and 12 bytes representing a portion of actual text data.

Exclusive-OR operation between text data and playback key data 16-byte by 16-byte (frame-by-frame) encrypts the text data. Exclusive-OR operation between encryption-resultant text data and playback key data 16-byte by 16-byte decrypts the encryption-resultant text data.

Sixth Embodiment

Figure 29:
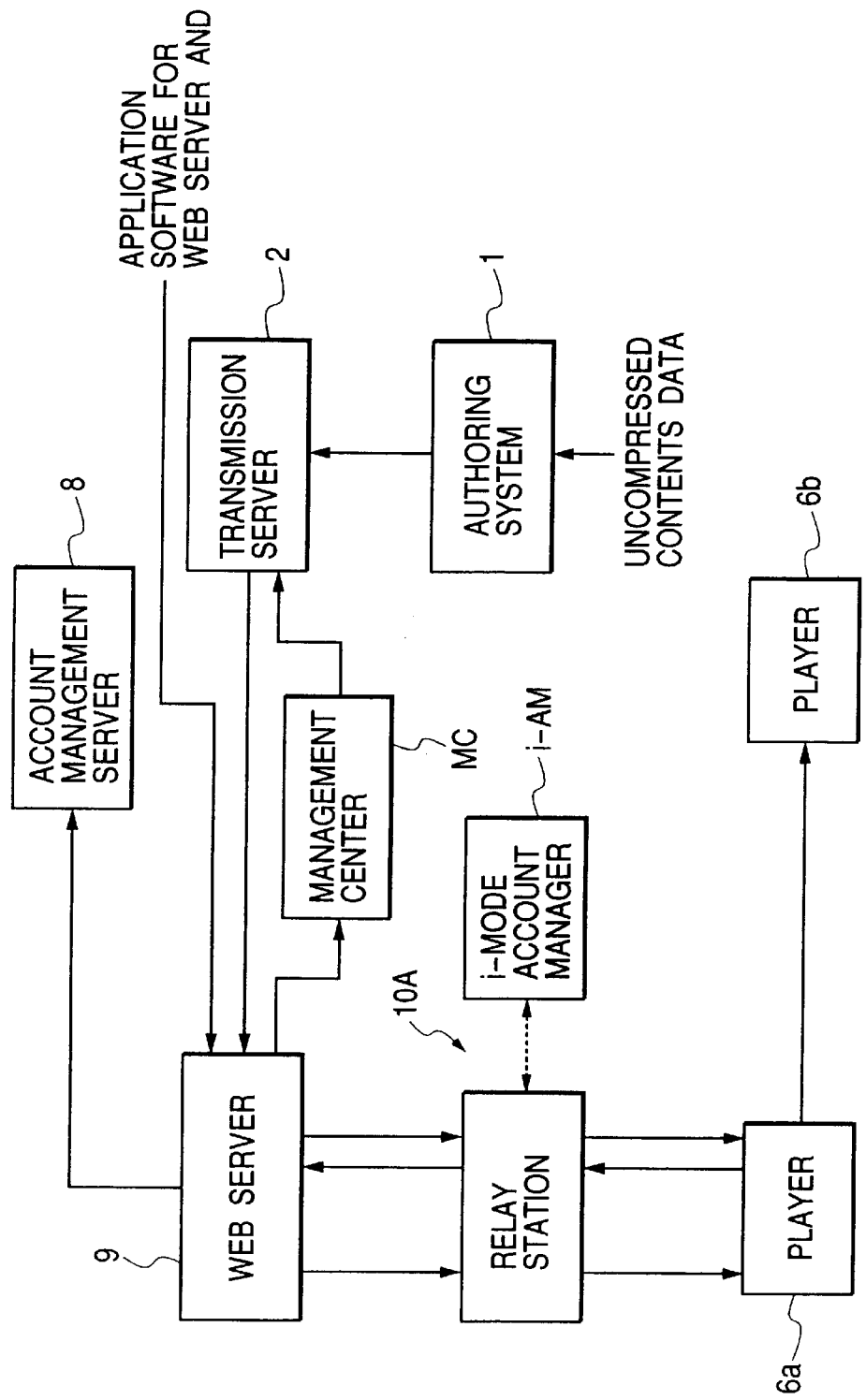
FIG. 29 is a block diagram of a contents sale system according to a sixth embodiment of this invention.

FIG. 29 shows a contents sale system according to a sixth embodiment of this invention. The contents sale system in FIG. 29 is similar to the contents sale system in FIG. 11 except for design changes mentioned hereinafter. It should be noted that the contents sale system in FIG. 1 and the contents sale system in FIG. 29 may be combined into a versatile contents sale system.

The contents sale system in FIG. 29 includes an i-mode mobile telephone relay station 10A instead of the PC client 10 (see FIG. 11). Here, "i-mode" means a contents-information transmission service provided by a mobile telecommunication company to users of mobile telecommunication terminals via the Internet. The relay station 10A is provided with an i-mode account manager i-AM. The account manager i-AM executes account management similar to that carried out by an account management server 8.

The contents sale system in FIG. 29 also includes a management center MC connected between a transmission server 2 and a web server 9. In the contents sale system of FIG. 29, a customer's player 6a includes a mobile telephone terminal which can operate in an i-mode. The customer's player 6a can be connected with the relay station 10A on an i-mode basis.

In the case where the customer's player 6a is connected with the relay station 10A on the i-mode basis, the customer's player 6a can transmit a signal of an order for desired contents to the management center MC via the relay station 10A and the web server 9. As a reply to the order, the customer's player 6a can receive desired contents data via the web server 9 and the relay station 10A.

Communications among the web server 9, the relay station 10A, and the customer's player 6a are basically similar to those among the web server 9, the PC client 10, and the customer's player 6a (see FIGS. 12, 13, 14, 15, 16, and 17). Before communications are started, the customer's player 6a is connected with the relay station 10A on the i-mode basis. During communications, the customer's player 6a remains connected with the relay station 10A on the i-mode basis. After communications have been completed, the i-mode coupling between the customer's player 6a and the relay station 10A is disconnected.

What is claimed is:

1. In a contents sale system including a host apparatus, a sale source terminal apparatus, a sale destination terminal apparatus, and copy destination apparatus, a method comprising the steps of:

encrypting original contents data into encryption-resultant contents data in response to original playback key data by the host apparatus;

generating encryption key data on the basis of the original contents data by the host apparatus;

encrypting the original playback key data into first encryption-resultant playback key data using the encryption key data as encryption key by the host apparatus;

transmitting the encryption-resultant contents data and the first encryption-resultant playback key data to the sale source terminal apparatus by the host apparatus;

encrypting the first encryption-resultant playback key data into second encryption-resultant playback key data in response to an ID of the sale destination terminal apparatus by the sale source terminal apparatus;

transmitting the encryption-resultant contents data and the second encryption-resultant playback key data to the sale destination terminal apparatus by the sale source terminal apparatus;

enabling the sale destination terminal apparatus to decrypt the second encryption-resultant playback key data into the first encryption-resultant playback key data in response to the ID of the sale destination terminal apparatus;

enabling the sale destination terminal apparatus to decrypt the first encryption-resultant playback key data into the original playback key data;

enabling the sale destination terminal apparatus to decrypt the encryption-resultant contents data into the original contents data in response to the original playback key data;

encrypting the first encryption-resultant playback key data into third encryption-resultant playback key data in response to an ID of the copy destination terminal apparatus by the sale destination terminal apparatus; and transmitting the encryption-resultant contents data and the third encryption-resultant playback key data to the copy destination terminal apparatus by the sale destination terminal apparatus.

2. A method as recited in claim 1, further comprising the steps of providing a sale header which corresponds to the original contents data, and encrypting the original playback key data into the first encryption-resultant playback key data in response to the sale header.

3. A method as recited in claim 1, wherein the source terminal is located in a store.

4. A method as recited in claim 1, wherein the source terminal comprises an Internet server, and the transmission request signal is transmitted from the Internet server to the player via an Internet client.

5. A contents sale system comprising a host apparatus, a sale source terminal apparatus, a sale destination terminal apparatus, and a copy destination apparatus;

wherein the host apparatus comprises means for encrypting original contents data into encryption-resultant contents data in response to original playback key data, means for generating encryption key data on the basis of the original contents data, means for encrypting the original playback key data into first encryption-resultant playback key data in response to the encryption key data, and means for transmitting the encryption-resultant contents data and the first encryption-resultant playback key data to the sale source terminal apparatus;

wherein the sale source terminal apparatus comprises means for encrypting the first encryption-resultant playback key data into second encryption-resultant playback key data in response to an ID of a sale destination terminal apparatus, and means for transmitting the encryption-resultant contents data and the second encryption-resultant playback key data to the sale destination terminal apparatus;

wherein the sale destination terminal apparatus comprises means for decrypting the second encryption-resultant playback key data into the first encryption-resultant playback key data in response to the ID of the sale destination terminal apparatus, means for decrypting the first encryption-resultant playback key data into the original playback key data, and means for decrypting the encryption-resultant contents data into the original contents data in response to the original playback key data; and wherein the sale destination terminal apparatus comprises means for encrypting the first encryption-resultant playback key data into third encryption-resultant playback key data in response to an ID of the copy destination terminal apparatus, and means for transmitting the encryption-resultant contents data and the third encryption-resultant playback key data to the copy destination terminal apparatus.

6. A contents sale system as recited in claim 5, wherein the host apparatus comprises means for making the encryption-resultant contents data and the first encryption-resultant playback key data into a predetermined data structure, and means for transmitting the encryption-resultant contents data and the first encryption-resultant playback key data of the predetermined data structure to the sale source terminal apparatus.

7. A contents sale system as recited in claim 5, wherein the sale source terminal apparatus comprises means for receiving the ID of the sale destination terminal apparatus from the sale destination terminal apparatus.

8. A contents sale system as recited in claim 5, wherein the sale destination terminal apparatus comprises means for transmitting the ID of the sale destination terminal apparatus to the sale source terminal apparatus.

9. A contents sale system as recited in claim 5, wherein the copy destination terminal apparatus comprises means for decrypting the third encryption-resultant playback key data into the first encryption-resultant playback key data in response to the ID of the copy destination terminal apparatus, means for decrypting the first encryption-resultant playback key data into the original playback key data, and means for decrypting the encryption-resultant contents data into the original contents data in response to the original playback key data.

10. In a contents sale system as recited in claim 5, a medium handling data of a format for making ones of command signals and data signals transmitted between terminal apparatuses into a common format, and, in cases where a source apparatus among the terminal apparatuses transmits one of a command signal and a data signal to a destination apparatus among the terminal apparatuses, enabling the source apparatus to add an ID of the source apparatus to one of the command signal and the data signal transmitted to the destination apparatus.

* * * * *